United States Patent
Zheng et al.

(10) Patent No.: US 12,165,295 B2
(45) Date of Patent: Dec. 10, 2024

(54) DIGITAL IMAGE INPAINTING UTILIZING A CASCADED MODULATION INPAINTING NEURAL NETWORK

(71) Applicant: Adobe Inc., San Jose, CA (US)

(72) Inventors: Haitian Zheng, Rochester, NY (US); Zhe Lin, Fremont, CA (US); Jingwan Lu, Santa Clara, CA (US); Scott Cohen, Sunnyvale, CA (US); Elya Shechtman, Seattle, WA (US); Connelly Barnes, Seattle, WA (US); Jianming Zhang, Campbell, CA (US); Ning Xu, Milpitas, CA (US); Sohrab Amirghodsi, Seattle, WA (US)

(73) Assignee: Adobe Inc., San Jose, CA (US)

(*) Notice: Subject to any disclaimer, the term of this patent is extended or adjusted under 35 U.S.C. 154(b) by 297 days.

(21) Appl. No.: 17/661,985

(22) Filed: May 4, 2022

(65) Prior Publication Data
US 2023/0360180 A1 Nov. 9, 2023

(51) Int. Cl.
*G06T 5/77* (2024.01)
*G06T 3/4046* (2024.01)
*G06V 10/40* (2022.01)

(52) U.S. Cl.
CPC .............. *G06T 5/77* (2024.01); *G06T 3/4046* (2013.01); *G06V 10/40* (2022.01); *G06T 2207/20084* (2013.01)

(58) Field of Classification Search
None
See application file for complete search history.

(56) References Cited

U.S. PATENT DOCUMENTS

| 2018/0374199 A1 | 12/2018 | Shen et al. |
| 2019/0196698 A1 | 6/2019 | Cohen et al. |

(Continued)

FOREIGN PATENT DOCUMENTS

| CN | 111354059 A | 6/2020 |
| GB | 2586678 A | 3/2021 |
| WO | 2021/212810 A1 | 10/2021 |

OTHER PUBLICATIONS

Zhao, S., "Large Scale Image Completion via Co-Modulated Generative Adversarial Networks", arXiv e-prints, 2021. doi:10.48550/arXiv.2103.10428 (Year: 2021).*

(Continued)

*Primary Examiner* — Anand P Bhatnagar
*Assistant Examiner* — Charles C L Penny
(74) *Attorney, Agent, or Firm* — Keller Preece PLLC

(57) ABSTRACT

The present disclosure relates to systems, methods, and non-transitory computer readable media that generate inpainted digital images utilizing a cascaded modulation inpainting neural network. For example, the disclosed systems utilize a cascaded modulation inpainting neural network that includes cascaded modulation decoder layers. For example, in one or more decoder layers, the disclosed systems start with global code modulation that captures the global-range image structures followed by an additional modulation that refines the global predictions. Accordingly, in one or more implementations, the image inpainting system provides a mechanism to correct distorted local details. Furthermore, in one or more implementations, the image inpainting system leverages fast Fourier convolutions block within different resolution layers of the encoder architecture to expand the receptive field of the encoder and to allow the network encoder to better capture global structure.

20 Claims, 12 Drawing Sheets

(56) References Cited

U.S. PATENT DOCUMENTS

| | | | |
|---|---|---|---|
| 2020/0134834 | A1 | 4/2020 | Pao et al. |
| 2021/0150682 | A1 | 5/2021 | Sytnik et al. |
| 2021/0248721 | A1* | 8/2021 | Tian .................... G06T 7/12 |
| 2021/0383242 | A1 | 12/2021 | Ostyakov et al. |
| 2021/0390660 | A1* | 12/2021 | Baek .................... G06T 5/00 |
| 2021/0407051 | A1 | 12/2021 | Pardeshi et al. |
| 2022/0083806 | A1 | 3/2022 | Cho |
| 2022/0180490 | A1 | 6/2022 | Jo et al. |
| 2023/0196760 | A1 | 6/2023 | Dorum et al. |

OTHER PUBLICATIONS

Karras, T., Laine, S., Aittala, M., Hellsten, J., Lehtinen, J., and Aila, T., "Analyzing and Improving the Image Quality of StyleGAN", arXiv e-prints, 2019. doi:10.48550/arXiv.1912.04958 (Year: 2019).*

Suvorov, R., "Resolution-robust Large Mask Inpainting with Fourier Convolutions", arXiv e-prints, 2021. doi: 10.48550/arXiv.2109.07161 (Year: 2021).*

H. Cai, J. He, Y. Qiao and C. Dong, "Toward Interactive Modulation for Photo-Realistic Image Restoration," 2021 IEEE/CVF Conference on Computer Vision and Pattern Recognition Workshops (CVPRW), Nashville, TN, USA, 2021, pp. 294-303, doi:10.1109/CVPRW53098.2021.00039 (Year: 2021).*

Zhu, M., "Image Inpainting by End-to-End Cascaded Refinement With Mask Awareness", IEEE Transactions on Image Processing, vol. 30, IEEE, pp. 4855-4866, 2021. doi:10.1109/TIP.2021.3076310 (Year: 2021).*

Xiao, Q., Li, G., and Chen, Q., "Deep Inception Generative Network for Cognitive Image Inpainting", arXiv e-prints, 2018. doi:10.48550/arXiv.1812.01458 (Year: 2018).*

Kim, H., Choi, Y., Kim, J., Yoo, S., and Uh, Y., "Exploiting Spatial Dimensions of Latent in GAN for Real-time Image Editing", arXiv e-prints, 2021. doi:10.48550/arXiv.2104.14754 (Year: 2021).*

Badour AlBahar, Jingwan Lu, Jimei Yang, Zhixin Shu, Eli Shechtman, and Jia-Bin Huang. Pose with Style: Detail-preserving pose-guided image synthesis with conditional stylegan. ACM Transactions on Graphics, 2021.

Jean-Francois Aujol, Guy Gilboa, Tony Chan, and Stanley Osher. Structure-texture image decomposition—modeling, algorithms, and parameter selection. International journal of computer vision, 67(1):111-136, 2006.

Coloma Ballester, Marcelo Bertalmio, Vicent Caselles, Guillermo Sapiro, and Joan Verdera. Filling-in by joint inter-polation of vector fields and gray levels. IEEE transactions on image processing, 10(8):1200-1211, 2001.

Connelly Barnes, Eli Shechtman, Adam Finkelstein, and Dan B Goldman. Patchmatch: A randomized correspondence algorithm for structural image editing. ACM Trans. Graph., 28(3):24, 2009.

Marcelo Bertalmio, Luminita Vese, Guillermo Sapiro, and Stanley Osher. Simultaneous structure and texture image inpainting. IEEE transactions on image processing, 12(8):882-889, 2003.

Tony F Chan and Jianhong Shen. Nontexture inpainting by curvature-driven diffusions. Journal of visual communication and image representation, 12(4):436-449, 2001.

Lu Chi, Borui Jiang, and Yadong Mu. Fast fourier convolution. Advances in Neural Information Processing Systems, 33, 2020.

Taeg Sang Cho, Moshe Butman, Shai Avidan, and William T Freeman. The patch transform and its applications to image editing. In 2008 IEEE Conference on Computer Vision and Pattern Recognition, pp. 1-8. IEEE, 2008.

Antonio Criminisi, Patrick Perez, and Kentaro Toyama. Region filling and object removal by exemplar-based image inpainting. IEEE Transactions on image processing, 13(9):1200-1212, 2004.

Alexei A Efros and William T Freeman. Image quilting for texture synthesis and transfer. In Proceedings of the 28th annual conference on Computer graphics and interactive techniques, pp. 341-346. ACM, 2001.

Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pp. 2672-2680, 2014.

Ishaan Gulrajani, Faruk Ahmed, Martin Arjovsky, Vincent Dumoulin, and Aaron Courville. Improved training of wasserstein gans. arXiv preprint arXiv:1704.00028, 2017.

Martin Heusel, Hubert Ramsauer, Thomas Unterthiner, Bernhard Nessler, and Sepp Hochreiter. Gans trained by a two time-scale update rule converge to a local nash equilibrium. In Advances in Neural Information Processing Systems, pp. 6626-6637, 2017.

Yibing Song Wei Huang Hongyu Liu, Bin Jiang and Chao Yang. Rethinking image inpainting via a mutual encoder-decoder with feature equalizations. InProceedings of the European Conference on Computer Vision, 2020.

Xun Huang and Serge Belongie. Arbitrary style transfer in real-time with adaptive instance normalization. InProceedings of the IEEE International Conference on Computer Vision, pp. 1501-1510, 2017.

Xun Huang, Ming-Yu Liu, Serge Belongie, and Jan Kautz. Multimodal unsupervised image-to-image translation. In Proceedings of the European conference on computer vision (ECCV), pp. 172-189, 2018.

Satoshi Iizuka, Edgar Simo-Serra, and Hiroshi Ishikawa. Globally and locally consistent image completion. ACM Transactions on Graphics (ToG), 36(4):1-14, 2017.

Justin Johnson, Alexandre Alahi, and Li Fei-Fei. Perceptual losses for real-time style transfer and super-resolution. In European conference on computer vision, pp. 694-711. Springer, 2016.

Tero Karras, Samuli Laine, and Timo Aila. A style-based generator architecture for generative adversarial networks. In Proceedings of the IEEE/CVF Conference on Computer Vision and Pattern Recognition, pp. 4401-4410, 2019.

Tero Karras, Samuli Laine, Miika Aittala, Janne Hellsten, Jaakko Lehtinen, and Timo Aila. Analyzing and improving the image quality of StyleGAN. InProc. CVPR, 2020.

Hyunsu Kim, Yunjey Choi, Junho Kim, Sungjoo Yoo, and Youngjung Uh. Exploiting spatial dimensions of latent in gan for real-time image editing. In Proceedings of the IEEE Conference on Computer Vision and Pattern Recognition, 2021.

Diederik P Kingma and Jimmy Ba. Adam: A method for stochastic optimization.arXiv preprint arXiv:1412.6980, 2014.

Vivek Kwatra, Irfan Essa, Aaron Bobick, and Nipun Kwatra. Texture optimization for example-based synthesis. In ACM SIGGRAPH 2005 Papers, pp. 795-802. 2005.

Yanwei Li, Hengshuang Zhao, Xiaojuan Qi, Liwei Wang, Zeming Li, Jian Sun, and Jiaya Jia. Fully convolutional networks for panoptic segmentation. In Proceedings of the IEEE/CVF Conference on Computer Vision and Pattern Recognition, pp. 214-223, 2021.

Guilin Liu, Fitsum A Reda, Kevin J Shih, Ting-Chun Wang, Andrew Tao, and Bryan Catanzaro. Image inpainting for irregular holes using partial convolutions. In Proceedings of the European Conference on Computer Vision (ECCV), pp. 85-100, 2018.

Wenjie Luo, Yujia Li, Raquel Urtasun, and Richard Zemel. Understanding the effective receptive field in deep convolutional neural networks. In Proceedings of the 30th International Conference on Neural Information Processing Systems, pp. 4905-4913, 2016.

Lars Mescheder, Andreas Geiger, and Sebastian Nowozin. Which training methods for gans do actually converge? In International conference on machine learning, pp. 3481-3490. PMLR, 2018.

Takeru Miyato, Toshiki Kataoka, Masanori Koyama, and Yuichi Yoshida. Spectral normalization for generative adversarial networks. arXiv preprint arXiv:1802.05957, 2018.

Kamyar Nazeri, Eric Ng, Tony Joseph, Faisal Z Qureshi, and Mehran Ebrahimi. Edgeconnect: Generative image inpainting with adversarial edge learning. arXiv preprint arXiv:1901.00212, 2019.

Taesung Park, Ming-Yu Liu, Ting-Chun Wang, and Jun-Yan Zhu. Semantic image synthesis with spatially-adaptive normalization. In Proceedings of the IEEE Conference on Computer Vision and Pattern Recognition, 2019.

Taesung Park, Jun-Yan Zhu, Oliver Wang, Jingwan Lu, Eli Shechtman, Alexei A Efros, and Richard Zhang. Swapping autoencoder for deep image manipulation. arXiv preprint arXiv:2007.00653, 2020.

Deepak Pathak, Philipp Krahenbuhl, Jeff Donahue, Trevor Darrell, and Alexei A Efros. Context encoders: Feature learning by inpaint-

(56) References Cited

OTHER PUBLICATIONS ing. In Proceedings of the IEEE conference on computer vision and pattern recognition, pp. 2536-2544, 2016.

Jialun Peng, Dong Liu, Songcen Xu, and Houqiang Li. Generating diverse structure for image inpainting with hierarchical vq-vae. In Proceedings of the IEEE/CVF Conference on Computer Vision and Pattern Recognition (CVPR), pp. 10775-10784, 2021.

Yurui Ren, Xiaoming Yu, Ruonan Zhang, Thomas H. Li, Shan Liu, and Ge Li. Structureflow: Image inpainting via structure-aware appearance flow. In IEEE International Conference on Computer Vision (ICCV), 2019.

Tim Salimans and Durk P Kingma. Weight normalization: A simple reparameterization to accelerate training of deep neural networks. Advances in neural information processing systems, 29:901-909, 2016.

Jianhong Shen and Tony F Chan. Mathematical models for local nontexture inpaintings. SIAM Journal on Applied Mathematics, 62(3):1019-1043, 2002.

Yuhang Song, Chao Yang, Yeji Shen, Peng Wang, Qin Huang, and C-C Jay Kuo. Spg-net: Segmentation prediction and guidance network for image inpainting.arXiv preprint arXiv:1805.03356, 2018.

Roman Suvorov, Elizaveta Logacheva, Anton Mashikhin, Anastasia Remizova, Arsenii Ashukha, Aleksei Silvestrov, Naejin Kong, Harshith Goka, Kiwoong Park, and Victor Lempitsky. Resolution-robust large mask inpainting with fourier convolutions.arXiv preprint arXiv:2109.07161, 2021.

Zhentao Tan, Dongdong Chen, Qi Chu, Menglei Chai, Jing Liao, Mingming He, Lu Yuan, Gang Hua, and Nenghai Yu. Semantic image synthesis via efficient class-adaptive normalization.arXiv preprint arXiv:2012.04644, 2020.

Ziyu Wan, Jingbo Zhang, Dongdong Chen, and Jing Liao. High-fidelity pluralistic image completion with transformers.arXiv preprint arXiv:2103.14031, 2021.

Xintao Wang, Ke Yu, Chao Dong, and Chen Change Loy. Recovering realistic texture in image super-resolution by deep spatial feature transform. In Proceedings of the IEEE conference on computer vision and pattern recognition, pp. 606-615, 2018.

Zhou Wang, Alan C Bovik, Hamid R Sheikh, Eero P Simoncelli, et al. Image quality assessment: from error visibility to structural similarity.IEEE transactions on image processing, 13(4):600-612, 2004.

Wei Xiong, Jiahui Yu, Zhe Lin, Jimei Yang, Xin Lu, Connelly Barnes, and Jiebo Luo. Foreground-aware image inpainting. In Proceedings of the IEEE/CVF Conference on Computer Vision and Pattern Recognition, pp. 5840-5848, 2019.

Chao Yang, Xin Lu, Zhe Lin, Eli Shechtman, Oliver Wang, and Hao Li. High-resolution image inpainting using multi-scale neural patch synthesis. In 2017 IEEE Conference on Computer Vision and Pattern Recognition, CVPR 2017, Honolulu, HI, USA, Jul. 21-26, 2017, pp. 4076-4084, 2017.

Jie Yang, Zhiquan Qi, and Yong Shi. Learning to incorporate structure knowledge for image inpainting. In Proceedings of the AAAI Conference on Artificial Intelligence, vol. 34, pp. 12605-12612, 2020.

Zili Yi, Qiang Tang, Shekoofeh Azizi, Daesik Jang, and Zhan Xu. Contextual residual aggregation for ultra high-resolution image inpainting. In Proceedings of the IEEE/CVF Conference on Computer Vision and Pattern Recognition, pp. 7508-7517, 2020.

Jiahui Yu, Zhe Lin, Jimei Yang, Xiaohui Shen, Xin Lu, and Thomas S Huang. Generative image inpainting with contextual attention. In Proceedings of the IEEE conference on computer vision and pattern recognition, pp. 5505-5514, 2018.

Jiahui Yu, Zhe Lin, Jimei Yang, Xiaohui Shen, Xin Lu, and Thomas S Huang. Free-form image inpainting with gated convolution. InProceedings of the IEEE International Conference on Computer Vision, pp. 4471-4480, 2019.

Yu Zeng, Zhe Lin, Huchuan Lu, and Vishal M. Patel. Cr-fill: Generative image inpainting with auxiliary contextual reconstruction. InProceedings of the IEEE International Conference on Computer Vision, 2021.

Yu Zeng, Zhe Lin, Jimei Yang, Jianming Zhang, Eli Shechtman, and Huchuan Lu. High-resolution image inpainting with iterative confidence feedback and guided upsampling. arXiv preprint arXiv:2005.11742, 2020.

Richard Zhang, Phillip Isola, Alexei A Efros, Eli Shechtman, and Oliver Wang. The unreasonable effectiveness of deep features as a perceptual metric. In Proceedings of the IEEE Conference on Computer Vision and Pattern Recognition, pp. 586-595, 2018.

Shengyu Zhao, Jonathan Cui, Yilun Sheng, Yue Dong, Xiao Liang, Eric I Chang, and Yan Xu. Large scale image completion via co-modulated generative adversarial networks. arXiv preprint arXiv:2103.10428, 2021.

Haitian Zheng, Haofu Liao, Lele Chen, Wei Xiong, Tianlang Chen, and Jiebo Luo. Example-guided image synthesis using masked spatial-channel attention and self-supervision. In European Conference on Computer Vision, pp. 422-439. Springer, 2020.

Bolei Zhou, Agata Lapedriza, Aditya Khosla, Aude Oliva, and Antonio Torralba. Places: A 10 million image database for scene recognition. IEEE transactions on pattern analysis and machine intelligence, 40(6):1452-1464, 2017.

Github; PanopticFCN: Fully Convolutional Networks for Panoptic Segmentation; Date downloaded May 26, 2022; https://github.com/dvlab-research/PanopticFCN.

Search and Examination Report as received in GB application 2303646.0 dated Oct. 3, 2023.

U.S. Appl. No. 17/650,967, mailed Sep. 6, 2024, Office Action.

\* cited by examiner

| Methods | FID↓ | LPIPS↓ | U-IDS↑ | P-IDS↑ |
|---|---|---|---|---|
| CM-GAN | 1.749 | 0.195 | 37.09 | 20.69 |
| CoModGAN | 3.724 | 0.229 | 32.38 | 14.68 |
| Lama | 3.864 | 0.195 | 29.57 | 10.08 |
| ProFill | 7.700 | 0.230 | 21.19 | 3.87 |
| CRFill | 9.657 | 0.2331 | 22.90 | 5.53 |
| DeepFill v2 | 13.595 | 0.371 | 14.23 | 1.67 |
| DiverseStructure | 16.003 | 0.399 | 10.72 | 0.47 |
| EdgeConnect | 12.086 | 0.414 | 9.21 | 0.28 |
| ICT | 16.405 | 0.424 | 8.12 | 0.25 |
| HiFill | 37.484 | 0.336 | 9.86 | 0.96 |
| StructureFlow | 28.252 | 0.489 | 6.05 | 0.13 |
| MEDFE | 35.454 | 0.445 | 7.10 | 0.35 |

*Fig. 7*

| Methods | | FID↓ | LPIPS↓ | U-IDS↑ | P-IDS↑ |
|---|---|---|---|---|---|
| CoModGAN | FT, w/o m-$R_1$ | 2.530 | 0.221 | 36.59 | 21.10 |
| CoModGAN | FT | 2.475 | 0.221 | 36.58 | 21.55 |
| CM-GAN (global-global) | | 2.247 | 0.226 | 37.12 | 22.70 |
| CM-GAN (stylemapgan) | | 2.915 | 0.221 | 35.72 | 20.44 |
| CM-GAN (global-spatial) | | 2.187 | 0.225 | 37.76 | 23.86 |
| CM-GAN w/o FFC w/o perc. | | 2.265 | 0.218 | 37.85 | 24.01 |
| CM-GAN w/o perc. | | 2.335 | 0.220 | 37.52 | 22.83 |
| CM-GAN w/o FFC | | 1.860 | 0.197 | 36.27 | 19.80 |
| CM-GAN | | 1.749 | 0.195 | 37.09 | 20.69 |

*Fig. 8*

| Model | #Params of $G$ | #Params of $D$ | FLOPs |
|---|---|---|---|
| CoModGAN | 79.79M | 28.98M | 345.54G |
| CM-GAN | 75.28M | 28.98M | 373.60G |

Fig. 9

DIGITAL IMAGE INPAINTING UTILIZING A CASCADED MODULATION INPAINTING NEURAL NETWORK

BACKGROUND

In the field of digital image editing, computer-implemented models have become increasingly effective at producing realistic images from randomly sampled seeds or incomplete, masked digital images. Indeed, generative adversarial networks ("GANs") or patch matching models, have revolutionized digital image synthesis processes, enabling photorealistic rendering of complex scenes and inpainting digital images with missing or flawed pixels. Despite the advances of conventional digital image systems that utilize these models, however, conventional systems continue to suffer from a number of disadvantages, particularly in relation to accuracy, efficiency, and flexibility of implementing computing devices.

SUMMARY

This disclosure describes one or more embodiments of systems, methods, and non-transitory computer readable media that solve one or more of the foregoing or other problems in the art by inpainting digital images utilizing a cascaded modulation inpainting neural network. In particular, in one or more implementations the disclosed systems utilize a neural network design that includes an encoder that extracts multi-scale feature representations from an input image with holes and a decoder with cascaded modulation layers at each resolution level. For example, in one or more embodiments, at each cascaded modulation layer of the decoder the disclosed systems apply global modulation to perform coarse semantic-aware structure synthesis, then utilize spatial modulation to adjust the feature map in a spatially adaptive fashion. In some embodiments, each cascaded modulation block of the decoder applies global modulation followed by an additional global modulation for additional feature correction. Extensive experiments illustrate that exemplary implementations of the disclosed systems significantly outperform existing methods in accurately, efficiently, and flexibly generating inpainted digital images.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 7 illustrates a table of experimental results in accordance with one or more embodiments;

FIG. 8 illustrates an additional table of experimental results in accordance with one or more embodiments;

FIG. 9 illustrates another table of experimental results in accordance with one or more embodiments;

DETAILED DESCRIPTION

Figure 1:
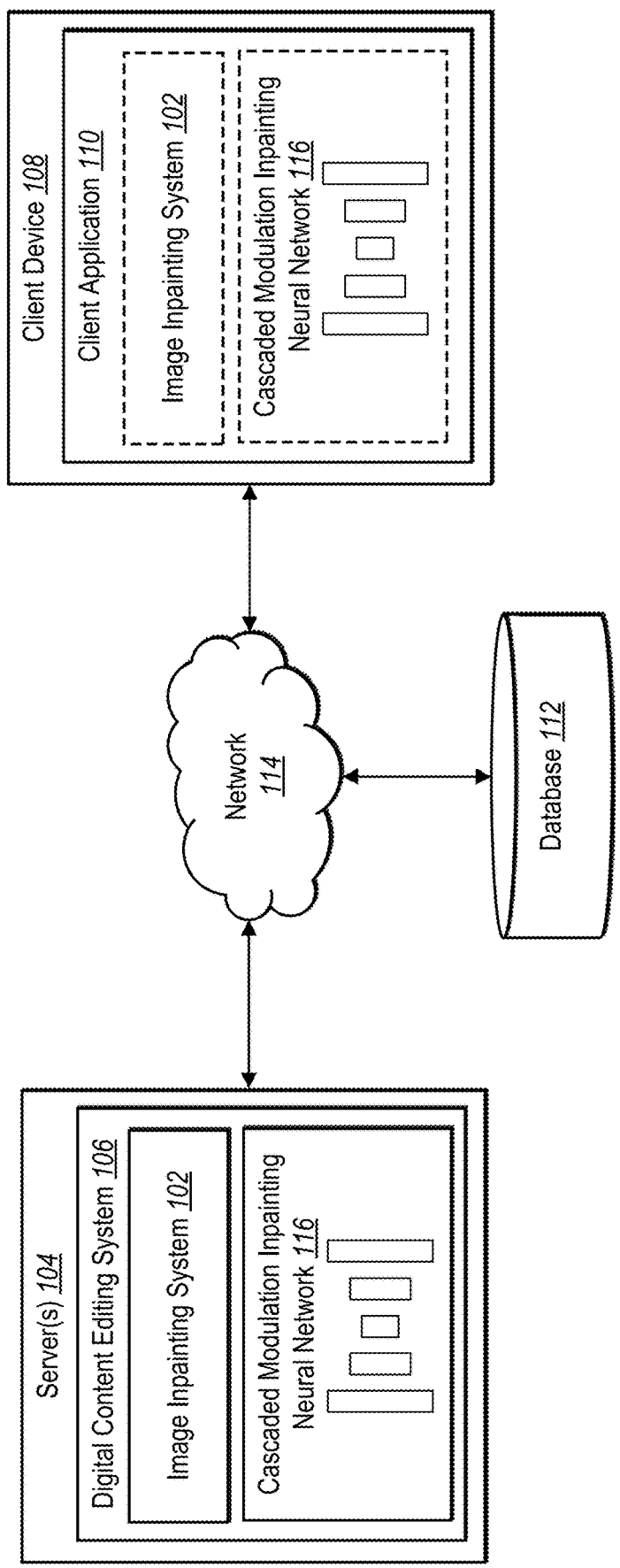
FIG. 1 illustrates an example system environment in which an image inpainting system operates in accordance with one or more embodiments.

This disclosure describes one or more embodiments of an image inpainting system that generates inpainted digital images utilizing a cascaded modulation inpainting neural network. In one or more embodiments, the image inpainting system utilizes cascaded modulation decoder layers that decompose an inference into multiple stages (e.g., global prediction and local refinement). For example, in each decoder layer, the image inpainting system starts with global code modulation that captures the global-range image structures followed by a spatially adaptive modulation that refines the global predictions. Accordingly, in one or more implementations, the image inpainting system provides a mechanism to correct distorted local details, making the inpainted pixels coherent with the rest of the image globally and locally. Furthermore, in one or more implementations, the image inpainting system leverages fast Fourier convolutions block at each stage of the encoder architecture to expand the receptive field of the encoder at early stages and to allow the network encoder to better capture global structure.

As just mentioned, in one or more implementations, the image inpainting system utilizes a cascaded modulation inpainting neural network. For example, the image inpainting system utilizes a plurality of convolutional neural network encoder layers to process a digital image at different scales/resolutions to generate encoded feature vectors. Moreover, in one or more implementations the image inpainting system utilizes these encoded feature vectors to generate an image encoding (e.g., global feature code or other feature vector) that represents global features of the digital image. As mentioned, in one or more implementations, the image inpainting system utilizes encoder layers that include Fourier convolution blocks to expand the receptive field of the encoder.

In addition, the image inpainting system utilizes a unique cascaded modulation decoder architecture to generate an inpainted digital image. To illustrate, each cascaded modulation layer includes a global modulation block and an additional modulation block (such as a spatial modulation block or another global modulation block). In one or more embodiments, these modulation blocks implement different modulation operations to generate different feature map representations. Thus, for example, a global modulation block applies a modulation based on a global feature code to an input global feature map to generate a new global feature map. Similarly, a spatial modulation block can apply a spatial modulation (e.g., based on a spatial tensor together with a global feature code) to an input local feature map to generate a new local feature map.

In one or more embodiments, the individual modulation blocks include multiple modulation operations. For example, in some implementations, the global modulation block includes a first global modulation operation that applies a first modulation layer, an upsampling layer, a first convolutional layer, and a first normalization layer. In one or more embodiments, the image inpainting system utilizes the first global modulation operation to generate an intermediate global feature from a global feature map. Similarly, in some embodiments the global modulation block also includes a second global modulation operation that applies a second modulation layer, a second convolutional layer, and a second normalization layer. For instance, the second global modulation generates a global feature map for the global modulation block from the intermediate global feature.

In addition, in some implementations, the spatial modulation block includes multiple modulation operations. Indeed, a spatial modulation block can include a global modulation operation and a spatial modulation operation. For example, the image inpainting system utilizes the first global modulation operation to generate an intermediate local feature from a local feature map. Moreover, the image inpainting system utilizes the spatial modulation operation to generate a new local feature map from the intermediate local feature.

In one or more implementations, the image inpainting system cascades information from the global modulation block to the spatial modulation block at each cascaded modulation layer. For example, the image inpainting system generates a spatial tensor for the spatial modulation block from the intermediate global feature of the global modulation block. In particular, in some implementations, the image inpainting system applies a convolutional neural network layer (e.g., a convolutional affine parameter network) to generate a spatial tensor utilized in the spatial modulation operation of the spatial modulation block. Specifically, in one or more embodiments, the image inpainting system combines this spatial tensor with a global feature code to generate a modified spatial tensor that is utilized in the spatial modulation operation of the spatial modulation block.

In one or more embodiments, the image inpainting system iteratively applies cascaded modulation layers at different resolutions. For example, each cascaded modulation layer utilizes the global feature map and local feature map from the previous layer to generate a new global feature map and a new local feature map utilizing a global modulation block and a spatial modulation block. In this manner, the image inpainting system utilizes multiple cascaded modulation layers of the decoder to generate an inpainted digital image.

In this manner, the image inpainting system can generate and utilize inpainted digital images for a variety of applications. To illustrate, in some implementations the image inpainting system receives, via a client device, a digital image with a replacement region (e.g., a region portraying a distracting object). In response, the image inpainting system generates an inpainted digital image that replaces the distracting object with replacement pixels. Moreover, the image inpainting system provides the inpainted digital image for display to the client device. Thus, the image inpainting system generates inpainted digital images for a variety of applications, such as distracting object removal, image re-targeting, image compositing, and/or 3D effects.

As suggested above, conventional systems exhibit a number of shortcomings or disadvantages, particularly in accuracy, flexibility, and efficiency of implementing computing devices. For example, conventional systems often struggle to generate plausible image structures when dealing with large holes in complex images. To illustrate, conventional systems often generate inpainted digital images with unrealistic content and visual artifacts. For example, although patch matching approaches are often effective for generating stationary textures or completing simple shapes they cannot hallucinate new textures or image structures. Similarly, deep learning approaches often struggle to generate content that is consistent both within the hole and with existing digital content outside the hole. In other words, conventional systems struggle to infer semantic clues from an incomplete digital image while propagating low-level visual features in a global range.

These inaccuracies often result from inflexibility of conventional systems. For example, inaccuracies in inpainting large holes are partially due to the lack of flexible network structures that can capture both the long-range dependency and the high-level semantics of an image. Thus, for example, patching matching approaches lack mechanisms to model high-level semantics for completing new semantic structure inside the hole. Similarly, deep learning approaches lack structural approaches to capture semantic information for global structure completion. Indeed, one recent deep learning approach—as described by Shengyu Zhao, Jonathan Cui, Yilun Sheng, Yue Dong, Xiao Liang, Eric I Chang, and Yan Xu, in Large scale image completion via co-modulated generative adversarial networks, arXiv preprint arXiv: 2103.10428 (2021) (hereinafter "CoModGAN")—utilizes a co-modulation mechanism that decodes encoded image features with global code modulation. However, this approach is limited in recovering spatial or other feature details and utilizes skip connections that pass invalid contextual features generated by an encoder to the decoder inside the hole. Moreover, many new inpainting models are inflexible in that they are incompatible with the most recent GAN architectures, such as the architecture described by Tero Karras, Samuli Laine, Miika Aittala, Janne Hellsten, Jaakko Lehtinen, and Timo Aila in Analyzing and improving the image quality of StyleGAN, Proc. CVPR (2020) (hereinafter StyleGan2), which is incorporated by reference herein in its entirety.

Moreover, conventional systems are also inaccurate in their encoding approaches. Indeed, some conventional systems utilize full convolutional models that suffer from slow growth of effective receptive field at early stages of the encoder. Accordingly, utilizing strided convolution within the encoder can generate invalid features inside the hole region, making the feature correction at decoding stage more challenging. Accordingly, conventional systems often generate additional inaccuracies in utilizing convolutional encoder architectures.

In addition, conventional systems are often inefficient, and require extensive computer resources to implement. Indeed, systems that seek to improve on the accuracy and flexibility concerns just discussed tend to further exacerbate these inefficiencies. To illustrate, improving accuracy of deep learning approaches often results in additional learned parameters and additional computing resources in memory and processing power to train and implement the deep learning models.

In one or more embodiments, the image inpainting system provides a variety of improvements or advantages over conventional systems. For example, by utilizing a cascaded modulation inpainting neural network, one or more embodiments of the image inpainting system generates more realistic and accurate inpainted digital images. As explained in greater detail below (e.g., with regard to FIGS. 7-8) experimental results demonstrate that example embodiments of the image inpainting system significantly improve accuracy relative to conventional systems.

In one or more implementations, these accuracy improvements stem from more flexible approach and architecture of the image inpainting system. As mentioned above, in one or more embodiments the image inpainting system utilizes cascaded modulation decoder layers. For example, in some implementations these cascaded modulation decoder layers include global code modulation (that captures the global-range image structures) and spatially adaptive modulation (that refines the global predictions in a spatially-varying manner). Therefore, unlike conventional systems, in one or more implementations the image inpainting system provides a mechanism to correct distorted local details, making the inpainted pixels coherent with the rest of the image globally and locally. Furthermore, in some embodiments, the image inpainting system utilizes modulation blocks (e.g., without instance normalization) to make the design compatible with more recent GAN architectures, such as StyleGAN2.

Moreover, in one or more embodiments, the image inpainting system also improves accuracy by utilizing a unique encoding architecture. For example, the image inpainting system utilizes fast Fourier convolution blocks within the encoder layers, expanding the receptive field of the encoder at early stages to allow the network encoder to better capture global structure. Indeed, the image inpainting system 102 utilizes fast Fourier convolutional blocks at each encoder layer (at different resolutions) to propagate features at early stages, which avoids generating invalid features inside the hole and improves results.

Furthermore, the image inpainting system improves accuracy and flexibility without sacrificing efficiency. Indeed, as discussed in greater detail below (e.g., with regard to FIG. 9), in one or more implementations the image inpainting system improves accuracy relative to conventional systems without increasing the number of parameters (and in some cases decreasing the number of parameters) utilized to generate the inpainted digital image. Accordingly, the image inpainting system improves accuracy without sacrificing (and, in some instances, improving) efficiency of computer memory and processing power relative to conventional systems.

Additional detail regarding the image inpainting system will now be provided with reference to the figures. For example, FIG. 1 illustrates a schematic diagram of an example system environment for implementing the image inpainting system 102 in accordance with one or more embodiments. An overview of the image inpainting system 102 is described in relation to FIG. 1. Thereafter, a more detailed description of the components and processes of the image inpainting system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 12.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single instance of the client device 108, in some embodiments, the environment includes multiple different client devices, each associated with a different user (e.g., a digital image editor). The client device 108 communicates with the server(s) 104 via the network 114. For example, the client device 108 provides information to server(s) 104 indicating client device interactions (e.g., digital image selections, user interactions requesting generation or modification of digital images, or other input) and receives information from the server(s) 104 such as generated inpainted digital images. Thus, in some cases, the image inpainting system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital images such as inpainted digital images, masked digital images, and/or selectable options for generating and editing digital images (e.g., to indicate objects to remove and/or inpaint). In some cases, the client application 110 includes all or part of the image inpainting system 102 and/or the cascaded modulation inpainting neural network 116.

As illustrated in FIG. 1, the environment includes the server(s) 104. The server(s) 104 generates, tracks, stores, processes, receives, and transmits electronic data, such as indications of client device interactions and/or pixels of digital images. For example, the server(s) 104 receives data from the client device 108 in the form of an indication of a client device interaction to generate an inpainted digital image. In response, the server(s) 104 transmits data to the client device 108 to cause the client device 108 to display or present an inpainted digital image based on the client device interaction.

In some embodiments, the server(s) 104 communicates with the client device 108 to transmit and/or receive data via the network 114, including client device interactions, inpainted digital images, and/or other data. In some embodiments, the server(s) 104 comprises a distributed server where the server(s) 104 includes a number of server devices distributed across the network 114 and located in different physical locations. The server(s) 104 comprise a content server, an application server, a communication server, a web-hosting server, a multidimensional server, or a machine learning server. The server(s) 104 further access and utilize the database 112 to store and retrieve information such as a generative inpainting neural network (e.g., the cascaded modulation inpainting neural network 116), stored sample digital images for training, and/or generated inpainted digital images.

As further shown in FIG. 1, the server(s) 104 also includes the image inpainting system 102 as part of a digital content editing system 106. For example, in one or more implementations, the digital content editing system 106 is able to store, generate, modify, edit, enhance, provide, distribute, and/or share digital content, such as digital images. For example, the digital content editing system 106 provides tools for the client device 108, via the client application 110, to generate and modify digital images.

In one or more embodiments, the server(s) 104 includes all, or a portion of, the image inpainting system 102. For example, the image inpainting system 102 operates on the server(s) to train a generative inpainted neural network to generate inpainted digital images. In some cases, the image inpainting system 102 utilizes, locally on the server(s) 104 or from another network location (e.g., the database 112), a cascaded modulation inpainting neural network 116 including one or more constituent neural networks such as an encoder neural network, a generator neural network, and/or a discriminator neural network.

In certain cases, the client device 108 includes all or part of the image inpainting system 102. For example, the client device 108 generates, obtains (e.g., download), or utilizes one or more aspects of the image inpainting system 102, such as the cascaded modulation inpainting neural network 116, from the server(s) 104. Indeed, in some implementations, as illustrated in FIG. 1, the image inpainting system 102 is located in whole or in part on the client device 108. For example, the image inpainting system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the image inpainting system 102. For example, in some embodiments, the server(s) 104 train one or more neural networks discussed herein and provide the one or more neural networks to the client device 108 for implementation (e.g., to generate inpainted digital images at the client device 108). In some embodiments, the server(s) 104 train one or more neural networks, the client device 108 requests an inpainted digital image, the server(s) 104 generate an inpainted digital image utilizing the one or more neural networks and provide the inpainted digital image to the client device 108. Furthermore, in some implementations, the client device 108 assists in training one or more neural networks.

Although FIG. 1 illustrates a particular arrangement of the environment, in some embodiments, the environment has a different arrangement of components and/or may have a different number or set of components altogether. For instance, as mentioned, the image inpainting system 102 is implemented by (e.g., located entirely or in part on) the client device 108. In addition, in one or more embodiments, the client device 108 communicates directly with the image inpainting system 102, bypassing the network 114. Further, in some embodiments, the cascaded modulation inpainting neural network 116 is stored in the database 112, maintained by the server(s) 104, the client device 108, or a third-party device.

As mentioned, in one or more embodiments, the image inpainting system 102 utilizes a cascaded modulation inpainting neural network to generate inpainted digital images. For example, FIG. 2 illustrates the image inpainting system 102 generating an inpainted digital image 208 from a digital image 202 with a replacement region 204 utilizing the cascaded modulation inpainting neural network 116 in accordance with one or more embodiments.

Figure 2:
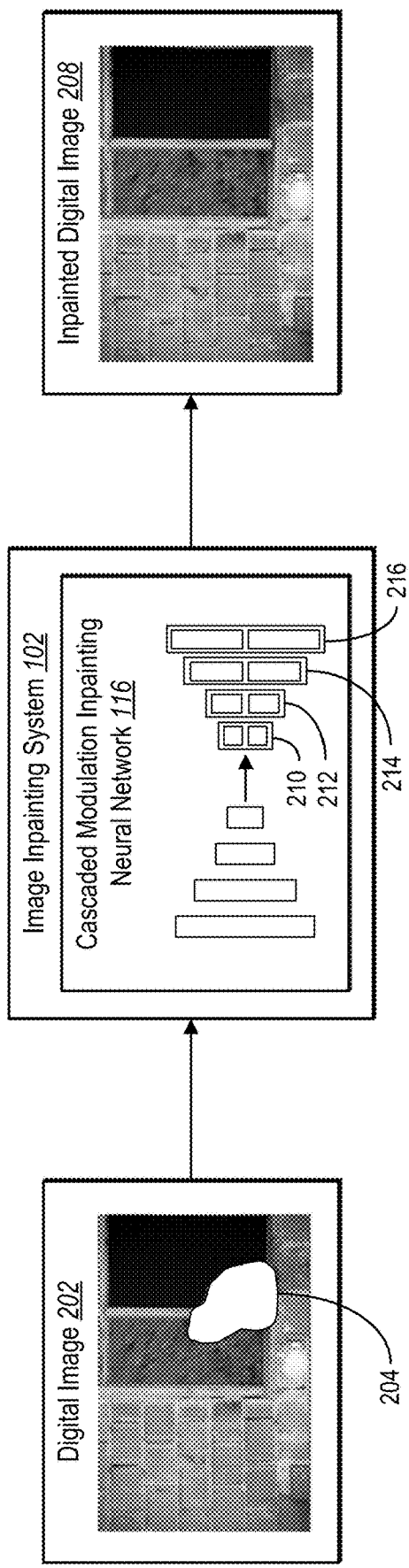
FIG. 2 illustrates an overview of utilizing a cascaded modulation inpainting neural network to generate an inpainted digital image in accordance with one or more embodiments.

As shown in FIG. 2, the image inpainting system 102 identifies the digital image 202 with a replacement region 204. In one or more embodiments, the image inpainting system 102 identifies the digital image 202 based on one or more user interactions at a client device. For example, a client device can select a digital image (e.g., from a repository of digital images stored at the client device or a remote server). Moreover, the image inpainting system 102 can receive an indication of a selection of a region of the digital image to replace, inpaint, or fill.

For example, the replacement region 204 can include an area, portion, mask, or hole within a digital image to replace, cover, or fill with replacement pixels. In some embodiments, the image inpainting system 102 identifies the replacement region 204 based on user selection of pixels to move, remove, cover, or replace from a digital image. To illustrate, a client device can select a distracting or undesired object or region of a digital image. The image inpainting system 102 can delete or remove the distracting or undesired object or region and generate replacement pixels. In some case, the image inpainting system 102 identifies the replacement region 204 by generating a digital image mask via a segmentation model (e.g., a segmentation neural network identifying an object to move or remove).

As shown, the image inpainting system 102 utilizes the cascaded modulation inpainting neural network 116 to generate replacement pixels for the replacement region 204. In some embodiments, the term neural network refers to a machine learning model that is trained and/or tuned based on inputs to generate predictions, determine classifications, or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network includes a convolutional neural network, a recurrent neural network (e.g., an LSTM), a graph neural network, a generative adversarial neural network, or other architecture.

Relatedly, a generative adversarial neural network (or "GAN") includes a neural network that is tuned or trained via an adversarial process to generate an output digital image (e.g., from an input digital image). In some cases, a generative adversarial neural network includes multiple constituent neural networks such as an encoder neural network and one or more decoder/generator neural networks. For example, an encoder neural network extracts latent code from a noise vector or from a digital image. A generator neural network (or a combination of generator neural networks) generates a modified digital image by combining extracted latent code (e.g., from the encoder neural network). During training, a discriminator neural network, in competition with the generator neural network, analyzes a generated digital image to generate an authenticity prediction by determining whether the generated digital image is real (e.g., from a set of stored digital images) or fake (e.g., not from the set of stored digital images). The discriminator neural network also causes the image inpainting system 102 to modify parameters of the encoder neural network and/or the one or more generator neural networks to eventually generate digital images that fool the discriminator neural network into indicating that a generated digital image is a real digital image.

Along these lines, a generative adversarial neural network refers to a neural network having a specific architecture or a specific purpose such as a generative inpainting neural network. For example, a generative inpainting neural network includes a generative adversarial neural network that inpaints or fills pixels of a digital image with replacement pixels. In some cases, a generative inpainting neural network inpaints a digital image by filling hole regions (indicated by digital image masks) which include pixels determine to be, or otherwise designated as, flawed, missing, or otherwise undesirable. Indeed, as mentioned above, in some embodiments a digital image mask defines a replacement region using a segmentation or a mask indicating, overlaying, covering, or outlining pixels to be removed or replaced within a digital image.

Accordingly, the cascaded modulation inpainting neural network 116 includes a generative inpainting neural network that utilizes a decoder having one or more cascaded modulation decoder layers. Indeed, as illustrated in FIG. 2, the cascaded modulation inpainting neural network 116 includes a plurality of cascaded modulation decoder layers 210-216. For example, a cascaded modulation decoder layer includes at least two connected (e.g., cascaded) modulations blocks for modulating an input signal in generating an inpainted digital image. To illustrate, a cascaded modulation decoder layer can include a first global modulation block and a second global modulation block. Similarly, a cascaded modulation decoder layer can include a first global modulation block (that analyzes global features and utilizes a global, spatially-invariant approach) and a second spatial modulation block (that analyzes local features utilizing a spatially-varying approach). Additional detail regarding modulation blocks will be provided below (e.g., in relation to FIGS. 3, 4).

As shown, the image inpainting system 102 utilizes the cascaded modulation inpainting neural network 116 (and the cascaded modulation decoder layers 210-216) to generate the inpainted digital image 208. Specifically, the cascaded modulation inpainting neural network 116 generates the inpainted digital image 208 by generating replacement pixels for the replacement region 204. As illustrated, the replacement region 204 is now filled with replacement pixels that portray a photorealistic scene in place of the replacement region 204.

Figure 3:
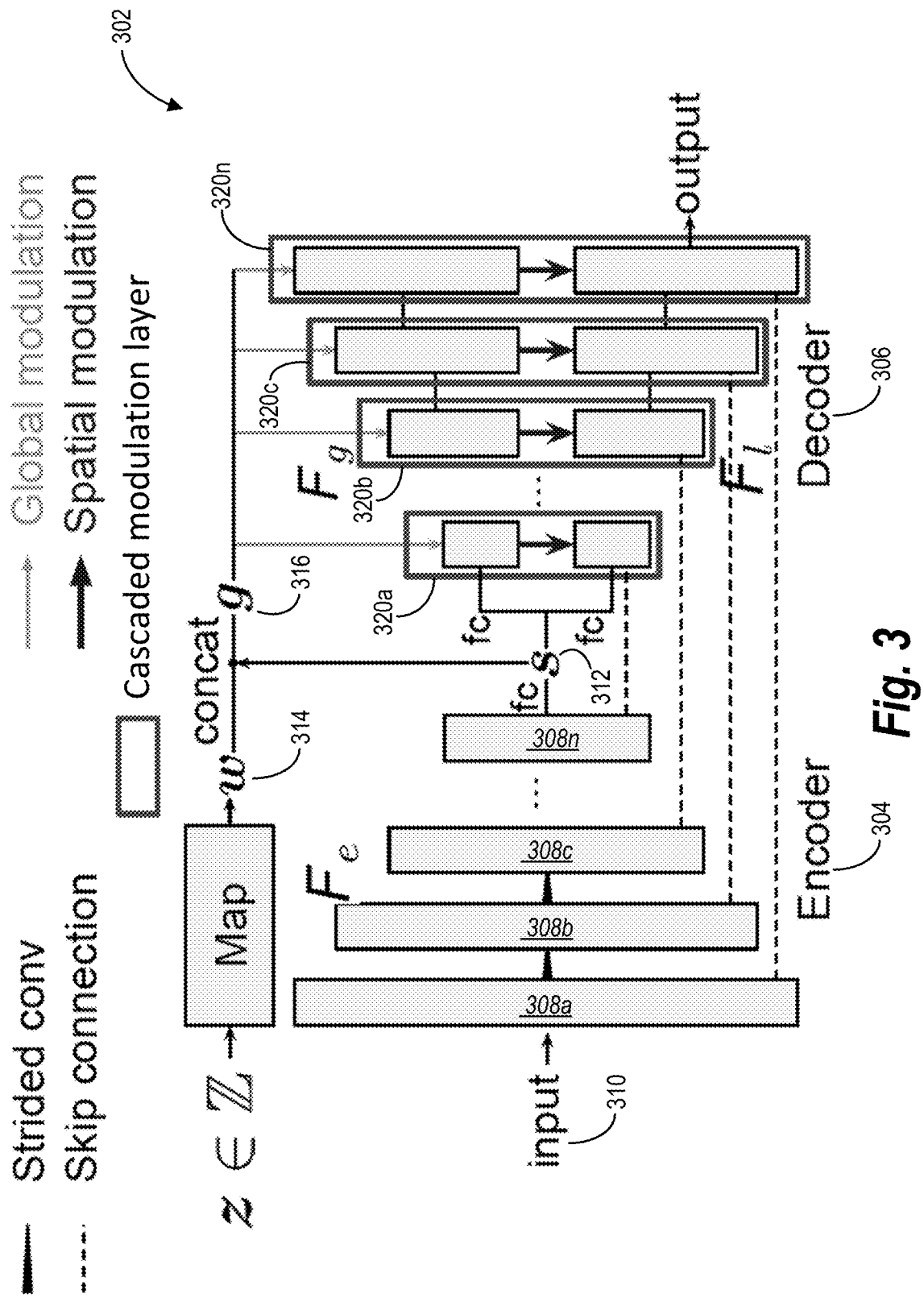
FIG. 3 illustrates an example architecture of a cascaded modulation inpainting neural network in accordance with one or more embodiments.

As mentioned above, the image inpainting system 102 utilizes a unique cascaded modulation inpainting neural network that includes cascaded modulation decoder layers to generate inpainted digital images. FIG. 3 illustrates an example architecture of a cascaded modulation inpainting neural network 302 in accordance with one or more embodiments.

As illustrated, the cascaded modulation inpainting neural network 302 includes an encoder 304 and a decoder 306. In particular, the encoder 304 includes a plurality of convolutional layers 308a-308n at different scales/resolutions. The image inpainting system 102 feeds the digital image input 310 (e.g., an encoding of the digital image) into the first convolutional layer 308a to generate an encoded feature vector at a higher scale (e.g., lower resolution). The second convolutional layer 308b processes the encoded feature vector at the higher scale (lower resolution) and generates an additional encoded feature vector (at yet another higher scale/lower resolution). The image inpainting system 102 iteratively generates these encoded feature vectors until reaching the final/highest scale convolutional layer 308n and generating a final encoded feature vector representation of the digital image.

As illustrated, in one or more embodiments, the image inpainting system 102 generates a global feature code from the final encoded feature vector of the encoder 304. A global feature code includes a feature representation of the digital image from a global (e.g., high-level, high-scale, low-resolution) perspective. In particular, a global feature code can include a representation of the digital image that reflects an encoded feature vector at the highest scale/lowest resolution (or a different encoded feature vector that satisfies a threshold scale/resolution).

As illustrated, in one or more embodiments, the image inpainting system 102 applies a neural network layer (e.g., a fully connected layer) to the final encoded feature vector to generate a style code 312 (e.g., a style vector). In addition, the image inpainting system 102 generates the global feature code by combining the style code 312 with a random style code 314. In particular, the image inpainting system 102 generates the random style code 314 by utilizing a neural network layer (e.g., a multi-layer perceptron) to process an input noise vector. The neural network layer maps the input noise vector to a random style code 314. The image inpainting system 102 combines (e.g., concatenates, adds, or multiplies) the random style code 314 with the style code 312 to generate the global feature code 316. Although FIG. 3 illustrates a particular approach to generate the global feature code 316, the image inpainting system 102 can utilize a variety of different approaches to generate a global feature code that represents encoded feature vectors of the encoder 304 (e.g., without the style code 312 and/or the random style code 314).

As mentioned above, the image inpainting system 102 can generate an image encoding utilizing the encoder 304. An image encoding refers to an encoded representation of the digital image. Thus, an image encoding can include one or more encoding feature vectors, a style code, and/or a global feature code.

In one or more embodiments, the image inpainting system 102 utilizes a plurality of Fourier convolutional encoder layer to generate an image encoding (e.g., the encoded feature vectors, the style code 312, and/or the global feature code 316). For example, a Fourier convolutional encoder layer (or a fast Fourier convolution) comprises a convolutional layer that includes non-local receptive fields and cross-scale fusion within a convolutional unit. In particular, a fast Fourier convolution can include three kinds of computations in a single operation unit: a local branch that conducts small-kernel convolution, a semi-global branch that processes spectrally stacked image patches, and a global branch that manipulates image-level spectrum. These three branches complementarily address different scales. In addition, a fast Fourier convolution can include a multi-branch aggregation process for cross-scale fusion. For example, in one or more embodiments, the image inpainting system 102 utilizes a fast Fourier convolutional layer as described by Lu Chi, Borui Jiang, and Yadong Mu in Fast fourier convolution, Advances in Neural Information Processing Systems, 33 (2020), which is incorporated by reference herein in its entirety.

Specifically, in one or more embodiments, the image inpainting system 102 utilizes Fourier convolutional encoder layers for each of the encoder convolutional layers 308a-308n. Thus, the image inpainting system 102 utilizes different Fourier convolutional encoder layers having different scales/resolutions to generate encoded feature vectors with improved, non-local receptive field.

Operation of the encoder 304 can also be described in terms of variables or equations to demonstrate functionality of the cascaded modulation inpainting neural network 302. For instance, as mentioned, the cascaded modulation inpainting neural network 302 is an encoder-decoder network with proposed cascaded modulation blocks at its decoding stage for image inpainting. Specifically, the cascaded modulation inpainting neural network 302 starts with an encoder E that takes the partial image and the mask as inputs to produce multi-scale feature maps from input resolution to resolution 4×4:

$$F_e^{(1)}, \ldots, F_e^{(4)} = E(x \odot (1-m), m),$$

where $F_e^{(i)}$ are the generated feature at scale $1 \leq i \leq L$ (and L is the highest scale or resolution). The encoder is implemented by a set of stride-2 convolutions with residual connection.

After generating the highest scale feature $F_e^{(L)}$, a fully connected layer followed by a $l_2$ normalization products a global style code $s = fc(F_e^{(L)})/\|fc(F_e^{(L)})\|_2$ to represent the input globally. In parallel to the encoder, an MLP-based mapping network produces a random style code w from a normalized random Gaussian noise z, simulating the stochasticity of the generation process. Moreover, the image inpainting system 102 joins w with s to produce the final global code $g = [s; w]$ for decoding. As mentioned, the image inpainting system 102 can utilize the final global code as an image encoding for the digital image.

As mentioned above, in some implementations, full convolutional models suffer from slow growth of effective receptive field, especially at the early stage of the network. Accordingly, utilizing strided convolution within the encoder can generate invalid features inside the hole region, making the feature correction at decoding stage more challenging. Fast Fourier convolution (FFC) can assist early layers to achieve receptive field that covers an entire image. Conventional systems, however, have only utilized FFC at a bottleneck layer, which is computationally demanding. Moreover, the shallow bottleneck layer cannot capture global semantic features effectively. Accordingly, in one or more implementations the image inpainting system 102 replaces the convolutional block in the encoder with FFC for the encoder layers. FFC enables the encoder to propagate features at early stage and thus address the issue of generating invalid features inside the hole, which helps improve the results.

As further shown in FIG. 3, the cascaded modulation inpainting neural network 302 also includes the decoder 306. As shown, the decoder 306 includes a plurality of cascaded modulation layers 320a-320n. The cascaded modulation layers 320a-320n process input features (e.g., input global feature maps and input local feature maps) to generate new features (e.g., new global feature maps and new local feature maps). In particular, each of the cascaded modulation layers 320a-320n operate at a different scale/resolution. Thus, the first cascaded modulation layer 320a takes input features at a first resolution/scale and generates new features at a lower scale/higher resolution (e.g., via upsampling as part of one or more modulation operations). Similarly, additional cascaded modulation layers operate at further lower scales/higher resolutions until generating the inpainted digital image at an output scale/resolution (e.g., the lowest scale/highest resolution).

Moreover, each of the cascaded modulation layers include multiple modulation blocks. For example, with regard to FIG. 3 the first cascaded modulation layer 320a includes a global modulation block and a spatial modulation block. In particular, the image inpainting system 102 performs a global modulation with regard to input features of the global modulation block. Moreover, the image inpainting system 102 performs a spatial modulation with regard to input features of the spatial modulation block. By performing both a global modulation and spatial modulation within each cascaded modulation layer, the image inpainting system 102 refines global positions to generate more accurate inpainted digital images.

As illustrated, the cascaded modulation layers 3320a-320n are cascaded in that the global modulation block feeds into the spatial modulation block. Specifically, the image inpainting system 102 performs the spatial modulation at the spatial modulation block based on features generated at the global modulation block. To illustrate, in one or more embodiments the image inpainting system 102 utilizes the global modulation block to generate an intermediate feature. The image inpainting system 102 then utilizes a convolutional layer (e.g., a 2-layer convolutional affine parameter network) to convert the intermediate feature to a spatial tensor. The image inpainting system 102 then utilizes the spatial tensor to modulate the input features analyzed by the spatial modulation block.

Figure 4:
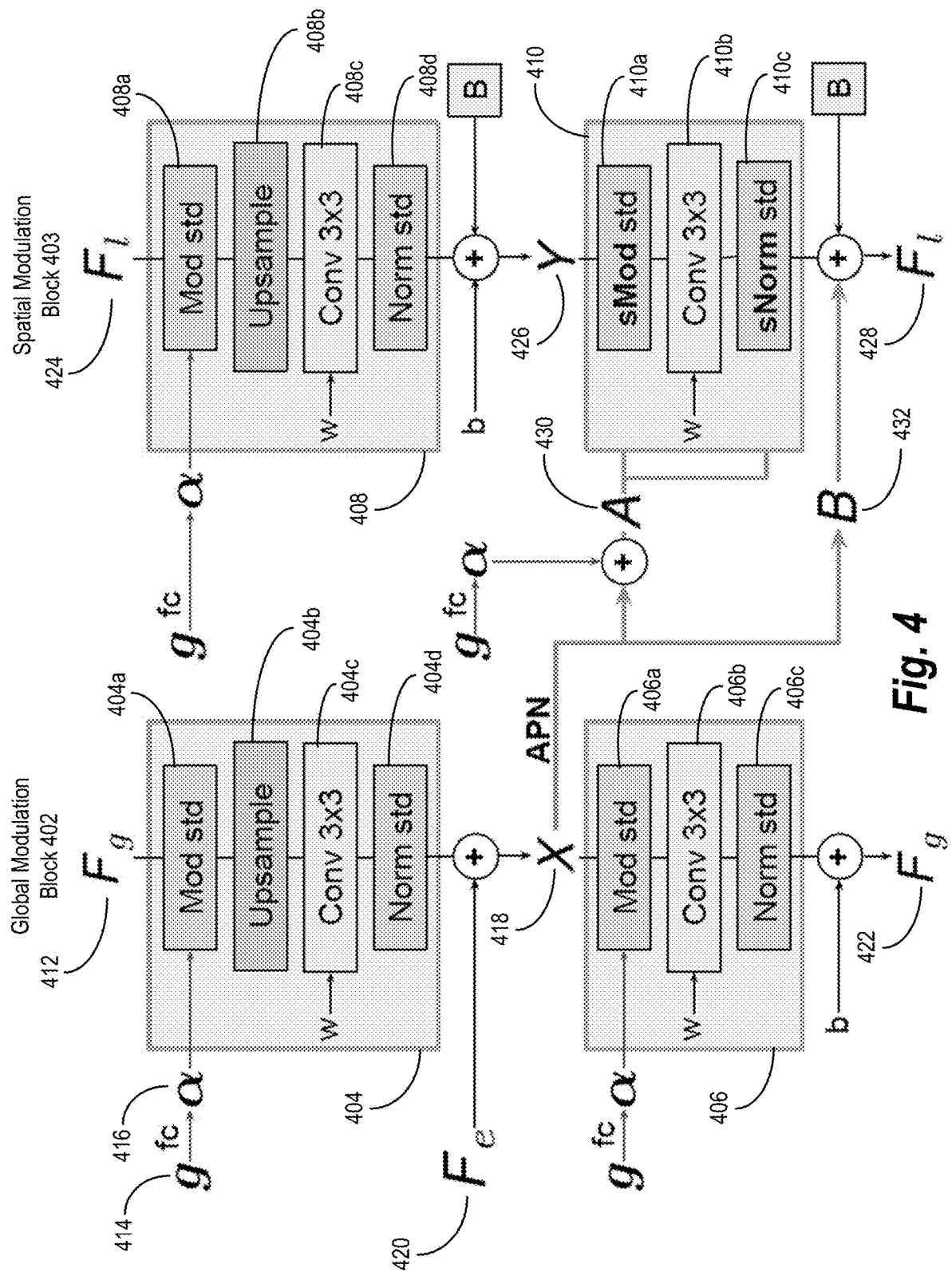
FIG. 4 illustrates an example architecture of a cascaded modulation layer of a decoder of a cascaded modulation inpainting neural network in accordance with one or more embodiments.

For example, FIG. 4 provides additional detail regarding operation of global modulation blocks and spatial modulation blocks in accordance with one or more embodiments. Specifically, FIG. 4 illustrates a global modulation block 402 and a spatial modulation block 403. As shown in FIG. 4, the global modulation block 402 includes a first global modulation operation 404 and a second global modulation operation 406. Moreover, the spatial modulation block 403 includes a global modulation operation 408 and a spatial modulation operation 410.

For example, a modulation block (or modulation operation) includes a computer-implemented process for modulating (e.g., scaling or shifting) an input signal according to one or more conditions. To illustrate, modulation block includes amplifying certain features while counteracting/normalizing these amplifications to preserve operation within a generative model. Thus, for example, a modulation block (or modulation operation) can include a modulation layer, a convolutional layer, and a normalization layer. The modulation layer scales each input feature of the convolution, and the normalization removes the effect of scaling from the statistics of the convolution's output feature maps.

Indeed, because a modulation layer modifies feature statistics, a modulation block (or modulation operation) often includes one or more approaches for addressing these statistical changes. For example, a modulation block (or modulation operation) can include a computer-implemented process that utilizes batch normalization or instance normalization to normalize a feature. The modulation is achieved by scaling and shifting the normalized activation according to affine parameters predicted from input conditions. Similarly, some modulation procedures replace feature normalization with a demodulation process. Thus, a modulation block (or modulation operation) can include a modulation layer, convolutional layer, and a demodulation layer. For example, in one or more embodiments, a modulation block (or modulation operation) includes the modulation approaches described in StyleGan2. A modulation block can include one or more modulation operations.

Moreover, global modulation block (or global modulation operation) refers to a modulation block (or modulation operation) that modulates an input signal in a spatially-invariant manner. For example, a global modulation block (or global modulation operation) performs a modulation according to global features of a digital image (e.g., that do not vary spatially across coordinates of a feature map or image). Thus, for example, a global modulation block includes a modulation block that modulates an input signal according to an image encoding (e.g., global feature code)

generated by an encoder. A global modulation block can include multiple global modulation operations.

A spatial modulation block (or spatial modulation operation) refers to a modulation block (or modulation operation) that modulates an input signal in a spatially-varying manner (e.g., according to a spatially-varying feature map). In particular, a spatial modulation block (or spatial modulation operation) can utilize a spatial tensor, to modulate an input signal in a spatially-varying manner. Thus, in one or more embodiments a global modulation block applies a global modulation where affine parameters are uniform across spatial coordinates. A spatial modulation block applies a spatially-varying affine transformation that varies across spatial coordinates. In some embodiments, a spatial modulation block can include both a spatial modulation operation in combination with another modulation operation (e.g., a global modulation operation and a spatial modulation operation).

For instance, a spatial modulation operation can include spatially-adaptive modulation as described by Taesung Park, Ming-Yu Liu, Ting-Chun Wang, and Jun-Yan Zhu in Semantic image synthesis with spatially-adaptive normalization, Proceedings of the IEEE Conference on Computer Vision and Pattern Recognition (2019), which is incorporated by reference herein in its entirety (hereinafter Taesung). In some embodiments, the spatial modulation operation utilizes a spatial modulation operation with a different architecture than Taesung, including a modulation-convolution-demodulation pipeline, as described in greater detail below.

Thus, with regard to FIG. 4, the image inpainting system 102 utilizes a global modulation block 402. As shown, the global modulation block 402 includes a first global modulation operation 404 and a second global modulation operation 406. Specifically, the first global modulation operation 404 processes an input global feature map 412. For example, the input global feature map 412 includes a feature vector generated by the cascaded modulation inpainting neural network reflecting global features (e.g., high-level features or features corresponding to the whole digital image). Thus, for example, the global feature map 412 includes a feature vector reflecting global features generated from a previous global modulation block of a cascaded decoder layer. The global feature map 412 can also include a feature vector corresponding to the encoded feature vectors generated by the encoder (e.g., at a first decoder layer the image inpainting system 102 can utilize an encoded feature vector, style code, global feature code, constant, noise vector, or other feature vector as input).

As shown, the first global modulation operation 404 includes a modulation layer 404a, an upsampling layer 404b, a convolutional layer 404c, and a normalization layer 404d. In particular, the image inpainting system 102 utilizes the modulation layer 404a to perform a global modulation of the initial global feature map 412 based on a global feature code 414 (e.g., the global feature code 316). Specifically, the image inpainting system 102 applies a neural network layer (i.e., a fully connected layer) to the global feature code 414 to generate a global feature vector 416. The image inpainting system 102 then modulates the initial global feature map 412 utilizing the global feature vector 416.

In addition, the image inpainting system 102 applies the upsampling layer 404b (e.g., to modify the resolution scale). Further, the image inpainting system 102 applies the convolutional layer 404c. In addition, the image inpainting system 102 applies the normalization layer 404d to complete the first global modulation operation 404. As shown, the first global modulation operation 404 generates a global intermediate feature 418. In particular, in one or more embodiments, the image inpainting system 102 generates the global intermediate feature 418 by combining (e.g., concatenating) the output of the first global modulation operation 404 with an encoded feature vector 420 (e.g., from a convolutional layer of the encoder having a matching scale/resolution).

As illustrated, the image inpainting system 102 also utilizes a second global modulation operation 406. In particular, the image inpainting system 102 applies the second global modulation operation 406 to the global intermediate feature 418 to generate a new global feature map 422. Specifically, the image inpainting system 102 applies a global modulation layer 406a to the global intermediate feature 418 (e.g., conditioned on the global feature vector 416). Moreover, the image inpainting system 102 applies a convolutional layer 406b, and a normalization layer 406c to generate a new global feature map 422. As shown, in some embodiments, the image inpainting system 102 applies a spatial bias in generating the new global feature map 422.

Furthermore, as shown in FIG. 4, the image inpainting system 102 utilizes a spatial modulation block 403. In particular, the spatial modulation block 403 includes a global modulation operation 408 and a spatial modulation operation 410. The global modulation operation 408 processes an input local feature map 424. For example, the input local feature map 424 includes a feature vector generated by the cascaded modulation inpainting neural network reflecting local features (e.g., low-level, specific, or spatially variant features). Thus, for example, the local feature map 424 includes a feature vector reflecting local features generated from a previous spatial modulation block of a cascaded decoder layer. The global feature map 412 can also include a feature vector corresponding to the encoded feature vectors generated by the encoder (e.g., at a first decoder layer the image inpainting system 102 can utilize an encoded feature vector, style code, noise vector or other feature vector).

As shown, the image inpainting system 102 utilizes the global modulation operation 408 to generate a local intermediate feature 426 from the local feature map 424. Specifically, the image inpainting system 102 applies a modulation layer 408a, an upsampling layer 408b, a convolutional layer 408c, and a normalization layer 408d. Moreover, in one or more embodiments, the image inpainting system 102 applies spatial bias and broadcast noise to the output of the global modulation operation 408 to generate the local intermediate feature 426.

As illustrated in FIG. 4, the image inpainting system 102 utilizes the spatial modulation operation 410 to generate a new local feature map 428. Indeed, the spatial modulation operation 410 modulates the local intermediate feature 426 based on the global intermediate feature 418. Specifically, the image inpainting system 102 generates a spatial tensor 430 from the global intermediate feature 418. For example, the image inpainting system 102 applies a convolutional affine parameter network to generate the spatial tensor 430. In particular, the image inpainting system 102 applies a convolutional affine parameter network to generate an intermediate spatial tensor. The image inpainting system 102 combines the intermediate spatial tensor with the global feature vector 416 to generate the spatial tensor 430. The image inpainting system 102 utilizes the spatial tensor 430 to modulate the local intermediate feature 426 (utilizing the spatial modulation layer 410a) and generated a modulated tensor.

As shown, the image inpainting system 102 also applies a convolutional layer 410b to the modulated tensor. In particular, the convolutional layer 410b generates a convolved feature representation from the modulated tensor. In addition, the image inpainting system 102 applies a normalization layer 410c to convolved feature representation to generate the new local feature map 428.

Although illustrated as a normalization layer 410c, in one or more embodiments, the image inpainting system 102 applies a demodulation layer. For example, the image inpainting system 102 applies a modulation-convolution-demodulation pipeline (e.g., general normalization rather than instance normalization). This approach can avoid potential artifacts (e.g., water droplet artifacts) caused by instance normalization. Indeed, a demodulation/normalization layer includes a layer that scales each output feature map by a uniform demodulation/normalization value (e.g., by a uniform standard deviation instead of instance normalization that utilizes data-dependent constant normalization based on the contents of the feature maps).

As shown in FIG. 4, in some embodiments, the image inpainting system 102 also applies a shifting tensor 432 and broadcast noise to the output of the spatial modulation operation 410. For example, the spatial modulation operation 410 generates a normalized/demodulated feature. The image inpainting system 102 also generates the shifting tensor 432 by applying the affine parameter network to the global intermediate feature 418. The image inpainting system 102 combines the normalized/demodulated feature, the shifting tensor 432, and/or the broadcast noise to generate the new local feature map 428.

Upon generating the new global feature map 422 and the new local feature map 428, the image inpainting system 102 proceeds to the next cascaded modulation layer in the decoder. For example, the image inpainting system 102 utilizes the new global feature map 422 and the new local feature map 428 as input features to an additional cascaded modulation layer at a different scale/resolution. The image inpainting system 102 then utilizes the additional cascaded modulation layer to generate additional feature maps (e.g., utilizing an additional global modulation block and an additional spatial modulation block). The image inpainting system 102 can iteratively process feature maps utilizing cascaded modulation layers until coming to a final scale/resolution to generate an inpainted digital image.

Although FIG. 4 illustrates the global modulation block 402 and the spatial modulation block 403, in some embodiments, the image inpainting system 102 utilizes a global modulation block followed cascaded to another global modulation block. For example, the image inpainting system 102 replaces the spatial modulation block 403 with an additional global modulation block. In such an embodiment, the image inpainting system 102 replaces APN (and spatial tensor) and corresponding spatial modulation illustrated in FIG. 4 with a skip connection. For example, the image inpainting system 102 utilizes the global intermediate feature to perform a global modulation with regard to the local intermediate vector. Thus, the image inpainting system 102 can utilizes a first global modulation block and a second global modulation block.

As mentioned, the decoder can also be described in terms of variables and equations to illustrate operation of the cascaded modulation inpainting neural network. For example, as discussed, the decoder stacks a sequence of cascaded modulation blocks to upsample the input feature map $F_e^{(L)}$. Each cascaded modulation block takes the global code g as input to modulate the feature according to the global representation of the partial image. Moreover, the image inpainting system 102 provides mechanisms to correct local error after predicting the global structure.

In particular, the image inpainting system 102 utilizes a cascaded modulation block to address the challenge of generating coherent features both globally and locally. At a high level, the image inpainting system 102 follows the following approach: i) decomposition of global and local features to separate local details from the global structure, ii) a cascade of global and spatial modulation that predicts local details from global structures. In one or more implementations, the image inpainting system 102 utilizes spatial modulations generated from the global code for better predictions (e.g., and discards instance normalization to make the design compatible with StyleGAN2).

More specifically, the cascaded modulation takes the global and local feature $F_g^{(i)}$ and $F_l^{(i)}$ from previous scale and the global code g as input and produces the new global and local features $F_g^{(i+1)}$ and $F_l^{(i+1)}$ at next scale/resolution. To produce the new global code $F_g^{(i+1)}$ from $F_g^{(i)}$, the image inpainting system 102 utilizes a global code modulation stage that includes a modulation-convolution-demodulation procedure. This generates an upsampled feature X.

Figure 5:
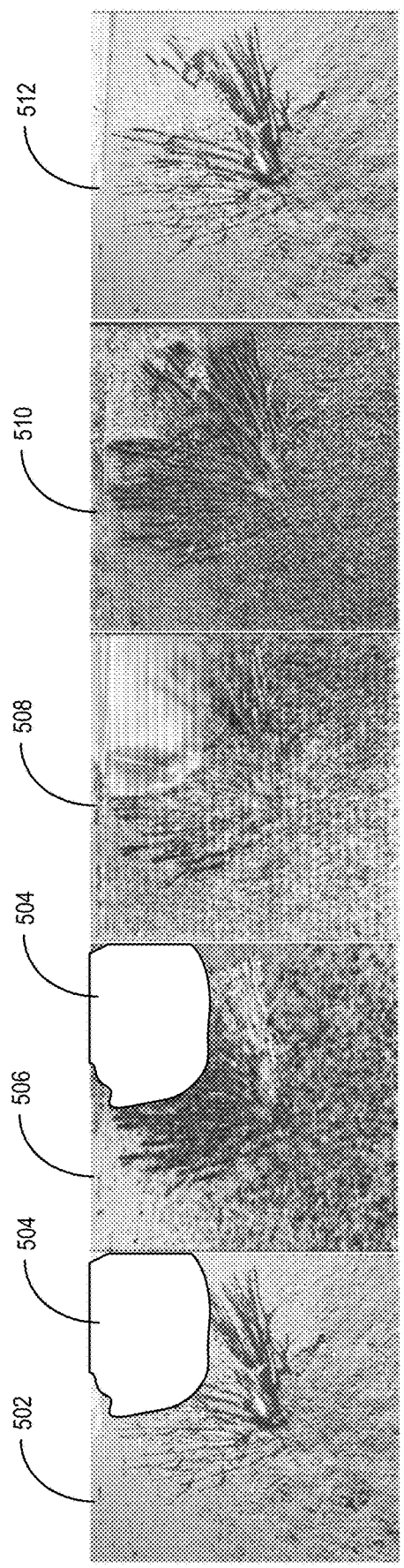
FIG. 5 illustrates an example of a digital image, encoded feature map, global feature map with global modulation, local feature map with spatial modulation, and inpainted digital image in accordance with one or more embodiments.

Due to the limited expressive power of the global vector g on representing 2-d visual details, and the inconsistent features inside and outside the hole, the global modulation may generate distorted features inconsistent with the context (as discussed in greater detail with regard to FIG. 5). To compensate, the image inpainting system 102 utilizes a spatial modulation that generates more accurate features. Specifically, the spatial modulation takes X as the spatial code and g as the global code to modulate the input local feature $F_l^{(i)}$ in a spatially adaptive fashion.

Moreover, the image inpainting system 102 utilizes a unique spatial modulation-demodulation mechanism to avoid potential "water droplet" artifacts caused by instance normalization in conventional systems. As shown, the spatial modulation follows a modulation-convolution-demodulation pipeline.

In particular, for spatial modulation, the image inpainting system 102 generates a spatial tensor $A_0$=APN(Y) from feature X by a 2-layer convolutional affine parameter network (APN). Meanwhile, the image inpainting system 102 generates a global vector $\alpha$=fc($g$) from global gode $g$ with a fully connected layer (fc) to capture global context. The image inpainting system 102 generates a final spatial tensor $A=A_0+\alpha$ as the broadcast summation of $A_0$ and $\alpha$ for scaling intermediate feature Y of the block with element-wise product ⊙:

$$\overline{Y} = Y \odot A$$

Moreover, for convolution, the modulated tensor $\overline{Y}$ is convolved with a 3×3 learnable kernel K, resulting in:

$$\hat{Y} = \overline{Y} * K$$

For spatially-aware demodulation, the image inpainting system 102 applies a demodularization step to compute the normalized output $\tilde{Y}$. Specifically, the image inpainting system 102 can assume that the input features Y are independent random variables with unit variance and after the modulation, the expected variance of the output is not changed, i.e., $\mathbb{E}_{y \in \hat{y}}[\text{Var}(y)]=1$. Accordingly, this gives the demodulation computation:

$$\tilde{Y} = \hat{Y} \odot D,$$

where $D = 1/\sqrt{K^2 \odot \mathbb{E}_{a \in A}[a^2]}$ is the demodulation coefficient. The image inpainting system 102 can implement the foregoing equation with standard tensor operations.

In one or more implementations, the image inpainting system 102 also adds spatial bias and broadcast noise. For example, the image inpainting system 102 adds the normalized feature $\tilde{Y}$ to a shifting tensor $B = APN(X)$ produced by another affine parameter network (APN) from feature X along with the broadcast noise n to product the new local feature $F_l^{(i+1)}$:

$$F_l^{(i+1)} = \tilde{Y} + B + n$$

For example, consider the following example pseudo code of the spatial modulation operation 410. Specifically, the affine parameters network (APN) is implemented as a 3-layer convolutional network that takes X as input to generate scaling parameters A and shifting parameters B.

```
def APN(X):
    # the 1×1 input layer
    t1=self.conv1_1×1(X)
    # the 3×3+1×1 middle layer
    t2=self.conv2_3×3(t1)
    t2=t2+self.conv2_1×1(t1)
    # the 1×1 output layer
    A=self.conv_A_1×1(t)
    B=self.conv_B_1×1(t)
    return A, B
```

Next, the spatial modulation takes feature maps X, Y and global code g as inputs to modulate Y:

```
import torch.nn.functional as F
def spatial_mod(X, Y, g, w, noise):
    bs=X.size(0) # batch size
    # get spatial code
    A, B=self.APN(X)
    # merge with global code
    A=A+self.fc(g).reshape(bs,-1,1,1)
    # spatial modulation
    Y=Y.mul(A)
    # conv
    Y=F.conv2d(Y, w)
    # spatial-aware normalization
    w=w.unsqueeze(0)
    A_avg_var=A.square( ).mean([2,3])
    reshape(bs,1,-1,1,1)
    D=(w.square( ).mul(A_avg_var)
    .sum(dim=[2,3,4])+1e-8
    ).rsqrt( )
    Y=Y.mul(D.reshape(bs,-1, 1, 1))
    # add bias and noise
    Y=Y+B+noise
    return Y
```

As mentioned above, the image inpainting system 102 utilizes spatial modulation to generate local feature maps that portray more realistic features within a replacement region. For example, FIG. 5 illustrates visual representations of features along various stages of the cascaded modulation inpainting neural network in accordance with one or more embodiments.

In particular, FIG. 5 illustrates a digital image 502 with a replacement region 504 and an inpainted digital image 512. The image inpainting system 102 utilizes an encoder of a cascaded modulation inpainting neural network to generate an encoded feature map 506. As shown, the encoded feature map 506 includes the replacement region 504. The image inpainting system 102 then utilizes a decoder of the cascaded modulation inpainting neural network to generate replacement pixels for the replacement region.

FIG. 5 illustrates an example illustration of a global feature map 508 (upon global modulation) and a local feature map 510 (upon spatial modulation) from a decoder layer of the cascaded modulation inpainting neural network. As shown, the local feature map 510 (i.e., a spatially modulated feature map) reflects more reasonable features than the global feature map 508 (i.e., a globally modulated feature map). Moreover, utilizing both the global features and local features generates the realistic inpainted digital image 512 that includes reasonable replacement pixels for the replacement region 504.

In one or more embodiments, the image inpainting system 102 learns parameters for a generative inpainting neural network (e.g., cascading modulation inpainting neural network) utilizing object-aware training. In particular, the image inpainting system 102 utilizes a mask generation scheme tailored for real-world use cases (e.g., object removal and completion). For example, the image inpainting system 102 leverages instance-level segmentation to generate sample digital images with object-aware masks that simulate real distractor or clutter removal use cases. In some cases, the image inpainting system 102 filters out sample digital images where an entire object (or a large part of it) is covered by a mask to prevent the generator from learning to produce distorted objects or color blobs. Furthermore, the image inpainting system 102 provides precise object boundaries for depicted objects, and thus, prevents a trained generative inpainting neural network from leaking pixel colors (e.g., where non-object pixel colors bleed with object pixel colors or vice-versa) at object boundaries.

In addition, in certain embodiments, the image inpainting system 102 learns parameters for a generative inpainting neural network utilizing masked regularization. To elaborate, the image inpainting system 102 utilizes a modified regularization technique such as R1 regularization that is tailored specifically for inpainting digital images. For instance, the image inpainting system 102 modifies an R1 regularization term to avoid computing penalties on a partial image and to thus impose a better separation of input conditions from generated outputs. In some cases, the image inpainting system 102 modifies R1 regularization utilizing a digital image mask to form a masked R1 regularization term. By utilizing masked regularization, in one or more embodiments, the image inpainting system 102 reduces or eliminates harmful impacts of computing regularization on a background of a digital image. For example, in one or more embodiments, the image inpainting system 102 utilizes the training approach as described in LEARNING PARAMETERS FOR GENERATIVE INPAINTING NEURAL NETWORKS UTILIZING OBJECT-AWARE TRAINING AND MASKED REGULARIZATION, U.S. patent application Ser. No. 17/650,967, filed Feb. 14, 2022, which is incorporated by reference herein in its entirety.

Figure 6:
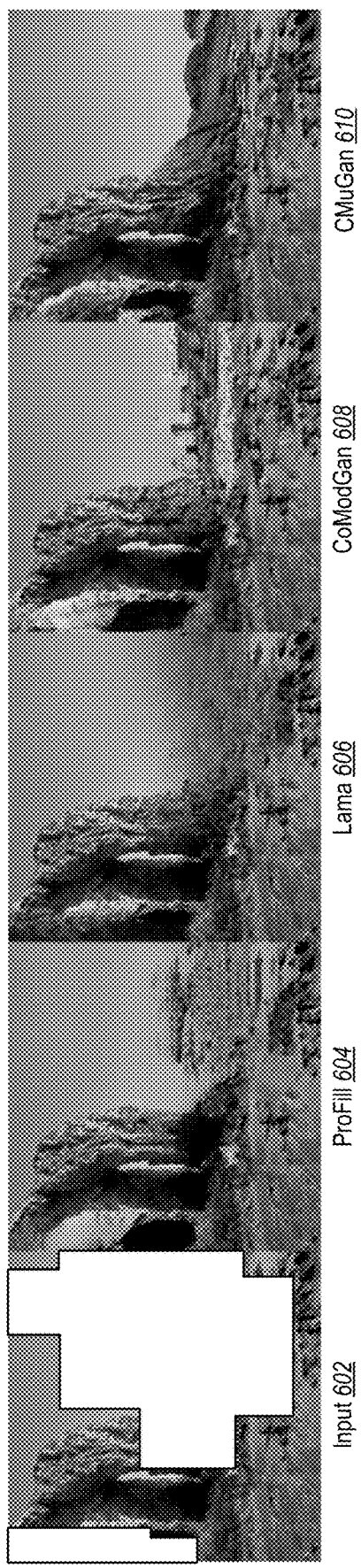
FIG. 6 illustrates an example comparison of inpainted digital images generated by different systems in accordance with one or more embodiments.

As mentioned above, researchers have conducted experiments to establish improvements provided by experimental embodiments of the image inpainting system 102 relative to conventional systems. For example, FIG. 6 illustrates a visual comparison between an example embodiment of a cascaded modulation inpainting neural network utilized by the image inpainting system 102 (i.e., an example cascaded modulation generative adversarial neural network, or "CM-GAN") and other conventional systems. In particular, FIG. 6 illustrates an input digital image 602 with multiple replacement regions. In addition, FIG. 6 illustrates a digital image 604 generated utilizing the approach described by Yu Zeng, Zhe Lin, Jimei Yang, Jianming Zhang, Eli Shechtman, and Huchuan Lu in High-resolution image inpainting with iterative confidence feedback and guided upsampling, arXiv preprint arXiv:2005.11742 (2020) (hereinafter "ProFill"). Similarly, FIG. 6 shows a digital image 606 generated utilizing the approach described by Roman Suvorov, Elizaveta Logacheva, Anton Mashikhin, Anastasia Remizova, Arsenii Ashukha, Aleksei Silvestrov, Naejin Kong, Harshith Goka, Kiwoong Park, and Victor Lempitsky, in Resolution-robust large mask inpainting with fourier convolutions, arXiv preprint arXiv:2109.07161 (2021) (hereinafter "LaMa"). FIG. 6 also shows a digital image 608 generated utilizing CoModGAN and a digital image 610 generated utilizing CM-GAN. As illustrated, the digital image 610 includes realistic structural features, while the other digital images include unrealistic features and artifacts.

Researchers have also conducted additional objective experiments to compare the image inpainting system 102 relative to conventional systems. For example, researchers have conducted image inpainting experiment at resolution 512×512 on the Places2 dataset. An experimental embodiment of the image inpainting system 102 (CM-GAN) was trained with Adam optimizer. The learning rate and batch size were set to 0.001 and 32, respectively. CM-GAN takes the resized image as input, so that the model can predict the global structure of an image. Researchers applied flip augmentation to increase the training samples.

For the numerical evaluation, researchers computed PSNR, SSIM, Frchet Inception Distance (FID), and Perceptual Image Patch Similarity Distance (LPIPS). Researchers also adopted the Paired/Unpaired Inception Discriminative Score (P-IDS/U-IDS) for evaluation. As shown, researchers compared the results of CoModGAN, Lama, and ProFill in addition to a variety of other systems, including those described by:

Yu Zeng, Zhe Lin, Huchuan Lu, and Vishal M. Patel in Cr-fill: Generative image inpainting with auxiliary contextual reconstruction, Proceedings of the IEEE International Conference on Computer Vision (2021) (hereinafter "CRFill");

Jiahui Yu, Zhe Lin, Jimei Yang, Xiaohui Shen, Xin Lu, and Thomas S Huang in Free-form image inpainting with gated convolution, Proceedings of the IEEE International Conference on Computer Vision, pages 4471-4480 (2019) (hereinafter "DeepFill v2");

Jialun Peng, Dong Liu, Songcen Xu, and Houqiang Li in Generating diverse structure for image inpainting with hierarchical vq-vae, Proceedings of the IEEE/CVF Conference on Computer Vision and Pattern Recognition (CVPR), pages 10775-10784 (2021) (hereinafter "DiverseStructure");

Kamyar Nazeri, Eric Ng, Tony Joseph, Faisal Z Qureshi, and Mehran Ebrahimi in Edgeconnect: Generative image inpainting with adversarial edge learning. arXiv preprint arXiv: 1901.00212 (2019) (hereinafter "EdgeConnect");

Ziyu Wan, Jingbo Zhang, Dongdong Chen, and Jing Liao in High-fidelity pluralistic image completion with transformers, arXiv preprint arXiv:2103.14031 (2021) (hereinafter "ICT");

Zili Yi, Qiang Tang, Shekoofeh Azizi, Daesik Jang, and Zhan Xu, in Contextual residual aggregation for ultra high-resolution image inpainting, Proceedings of the IEEE/CVF Conference on Computer Vision and Pattern Recognition, pages 7508-7517 (2020) (hereinafter "HiFill");

Yurui Ren, Xiaoming Yu, Ruonan Zhang, Thomas H. Li, Shan Liu, and Ge Li, in Structureflow: Image inpainting via structure-aware appearance flow, IEEE International Conference on Computer Vision (ICCV) (2019) (hereinafter "StructureFlow"); and Yibing Song Wei Huang Hongyu Liu, Bin Jiang and Chao Yang in Rethinking image inpainting via a mutual encoderdecoder with feature equalizations, Proceedings of the European Conference on Computer Vision (2020) (hereinafter "MEDFE").

FIG. 7 presents the results against these other systems. Results showed that the experimental embodiment of the image inpainting system 102 (CM-GAN) significantly outperforms all other methods in terms of FID, U-IDS and P-IDS. Compared to LaMa, the CM-GAN reduced FID by over 50% from 3.864 to 1.749, and is similar in terms of LPIPS, which can be explained by the typically blurry results of LaMa versus the sharper results of CM-GAN.

Researchers also performed a set of ablation experiments to show the importance of various components of the image inpainting system 102. These ablated models were trained and evaluated on the Places2 training set. Results of the ablations are shown in FIG. 8. The various ablations are described below.

With regard to cascaded modulation, researchers compared the cascaded modulation networks with a single-stage global modulation model, CoModGAN. For comparison, researchers also trained the CM-GAN without FFC layers (CM-GAN global-spatial). In addition, researchers further replaced the spatial modulation with skip connection, resulting in a model that cascades two global modulation decoders (CM-GAN global-global). Results show that cascaded modulation brings significant gain as it introduces the mechanism for feature correction.

With regard to spatial modulation, researchers evaluated CM-GAN with different spatial modulation methods. Specifically, researchers applied an existing spatial modulation approach described by Hyunsu Kim, Yunjey Choi, Junho Kim, Sungjoo Yoo, and Youngjung Uh, in Exploiting spatial dimensions of latent in gan for real-time image editing, Proceedings of the IEEE Conference on Computer Vision and Pattern Recognition (2021) (hereinafter StyleMapGAN), to the current network. However, researchers observed deteriorated results because instance normalization is not compatible with StyleGAN2 blocks. Researchers also replaced the spatial modulation with skip connection, resulting in a network that applies global modulation twice. Results show that CM-GAN (global-spatial) outperformed the global-global modulation as well as the StyleMapGAN modulation.

With regard to fast Fourier convolutions, researchers compared two variants of CM-GAN with or without the fast Fourier convolution. From the result, the fast Fourier convolution version can further improve the metrics.

With regard to perceptual loss, results indicated that the loss provides additional semantic supervision to the network and can significantly improve the FID metrics under different settings. Researchers also compared the co-modulation baseline with R1 and masked R1 regularization (m-R1). From the result, the masked R1 regularization improves the numerical metrics as the designed loss avoids computing gradient at pixel regions.

In addition, FIG. 9 illustrates inference complexities of various models. As shown, the experimental embodiment of the image inpainting system 102 has a similar number of parameters (and sometimes fewer) relative to CoModGAN and LaMa.

Figure 10:
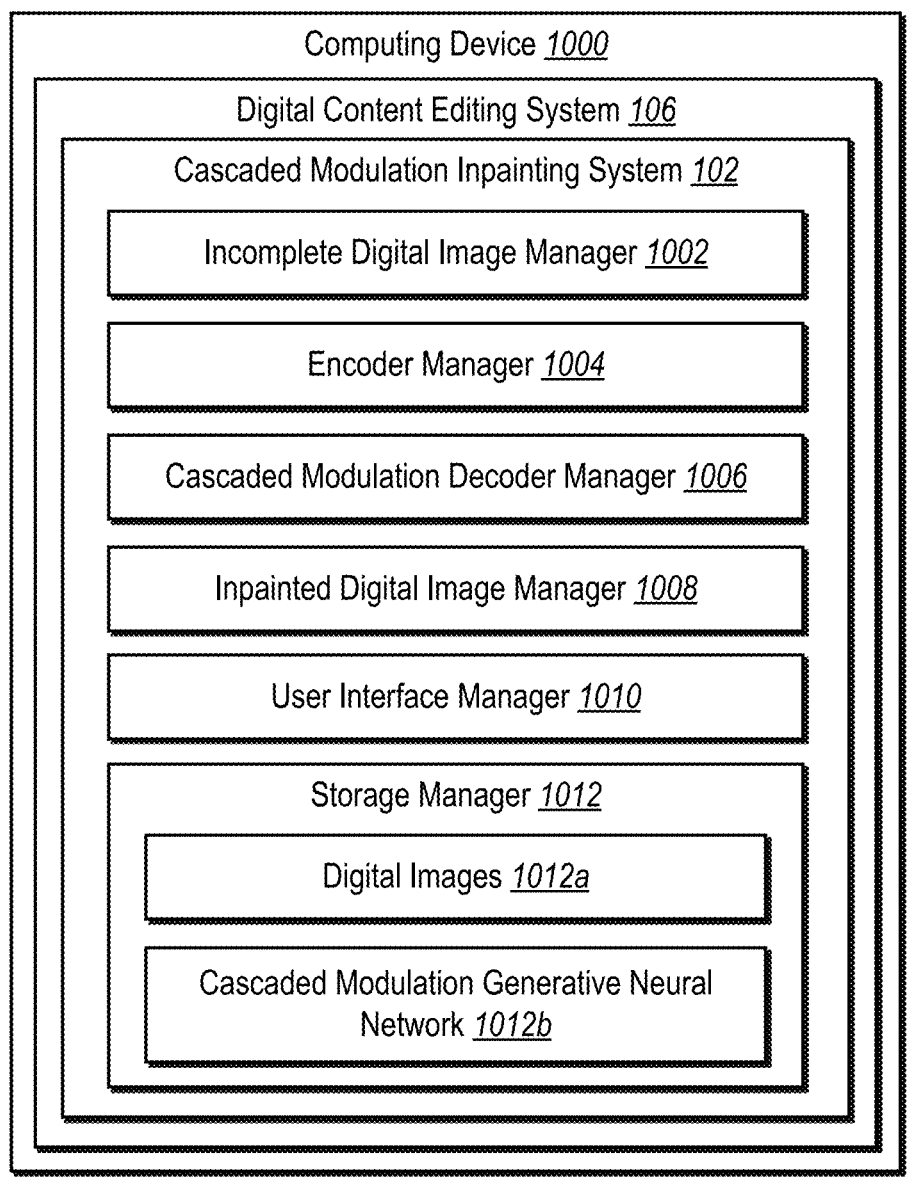
FIG. 10 illustrates a schematic diagram of an image inpainting system in accordance with one or more embodiments.

Looking now to FIG. 10, additional detail will be provided regarding components and capabilities of the image inpainting system 102. Specifically, FIG. 10 illustrates an example schematic diagram of the image inpainting system 102 on an example computing device 1000 (e.g., one or more of the client device 108 and/or the server(s) 104). As shown in FIG. 10, the image inpainting system 102 includes an incomplete digital image manager 1002, an encoder manager 1004, cascaded modulation decoder manager 1006, an inpainted digital image manager 1008, a user interface manager 1010, and a storage manager 1012.

As just mentioned, the image inpainting system 102 includes the incomplete digital image manager 1002. In particular, the incomplete digital image manager 1002 obtains, identifies, receives, generates, and/or or utilizes incomplete digital images. For example, as discussed above, the incomplete digital image manager 1002 can receive an incomplete digital image comprising a digital image with a hole or mask representing a replacement region.

As further mentioned, the image inpainting system 102 includes the encoder manager 1004. In particular, the encoder manager 1004 manages, trains, maintains, performs, implements, applies, or utilizes an encoder of a cascaded modulation inpainting neural network. For example, the encoder manager 1004 utilizes the above-described techniques to generate encoded feature vectors (e.g., a global feature code) corresponding to an incomplete digital image.

As shown, the image inpainting system 102 also includes the cascaded modulation decoder manager 1006. In particular, the cascaded modulation decoder manager 1006 trains, manages, maintains, performs, implements, or applies cascaded modulation decoder of a cascaded modulation inpainting neural network. For example, the cascaded modulation decoder manager 1006 applies a plurality of cascaded modulation layers (as described above) to generate global feature maps and local feature maps for determining replacement pixels for a replacement region.

The image inpainting system 102 also includes the inpainted digital image manager 1008. For example, the inpainted digital image manager 1008 can identify, generate, provide, and/or display an inpainted digital image. To illustrate, the inpainted digital image manager 1008 can identify replacement pixels (as generated by the cascaded modulation decoder manager 1006) to generate an inpainted digital image.

The image inpainting system 102 also includes a user interface manager 1010. The user interface manager 1010 can manage, generate, monitor, and/or provide user interfaces. For example, the user interface manager can receive user input from one or more user interfaces (e.g., indicating user selections of digital images and/or replacement regions). Similarly, the user interface manager 1010 can provide user interface elements for display via a display device of a client device. For example, the user interface manager 1010 can provide an inpainted digital image for display via a graphical user interface.

The image inpainting system 102 further includes a storage manager 1012. The storage manager 1012 operates in conjunction with, or includes, one or more memory devices (such as the database 112) that stores various data such as digital images 1012*a* (e.g., incomplete digital images or inpainted digital images) and/or a cascaded modulation generative neural network 1012*b* (e.g., the various parameters/layers of encoders and decoders as described above).

In one or more embodiments, each of the components of the image inpainting system 102 are in communication with one another using any suitable communication technologies. Additionally, the components of the image inpainting system 102 is in communication with one or more other devices including one or more client devices described above. It will be recognized that although the components of the image inpainting system 102 are shown to be separate in FIG. 10, any of the subcomponents may be combined into fewer components, such as into a single component, or divided into more components as may serve a particular implementation. Furthermore, although the components of FIG. 10 are described in connection with the image inpainting system 102, at least some of the components for performing operations in conjunction with the image inpainting system 102 described herein may be implemented on other devices within the environment.

The components of the image inpainting system 102 include software, hardware, or both. For example, the components of the image inpainting system 102 include one or more instructions stored on a computer-readable storage medium and executable by processors of one or more computing devices (e.g., the computing device 1000). When executed by the one or more processors, the computer-executable instructions of the image inpainting system 102 cause the computing device 1000 to perform the methods described herein. Alternatively, the components of the image inpainting system 102 comprise hardware, such as a special purpose processing device to perform a certain function or group of functions. Additionally, or alternatively, the components of the image inpainting system 102 include a combination of computer-executable instructions and hardware.

Furthermore, the components of the image inpainting system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the image inpainting system 102 may be implemented as part of a stand-alone application on a personal computing device or a mobile device. Alternatively, or additionally, the components of the image inpainting system 102 may be implemented in any application that allows creation and delivery of content to users, including, but not limited to, applications in ADOBE® EXPERIENCE MANAGER and CREATIVE CLOUD®, such as PHOTOSHOP®, LIGHTROOM®, and INDESIGN®. "ADOBE," "ADOBE EXPERIENCE MANAGER," "CREATIVE CLOUD," "PHOTOSHOP," "LIGHTROOM," and "INDESIGN" are either registered trademarks or trademarks of Adobe Inc. in the United States and/or other countries.

FIGS. 1-10 the corresponding text, and the examples provide a number of different systems, methods, and non-transitory computer readable media for training a generative inpainting neural network via object-aware training and/or masked regularization for accurate digital image inpainting. In addition to the foregoing, embodiments can also be described in terms of flowcharts comprising acts for accomplishing a particular result. For example, FIG. 11 illustrates flowcharts of example sequences or series of acts in accordance with one or more embodiments.

Figure 11:
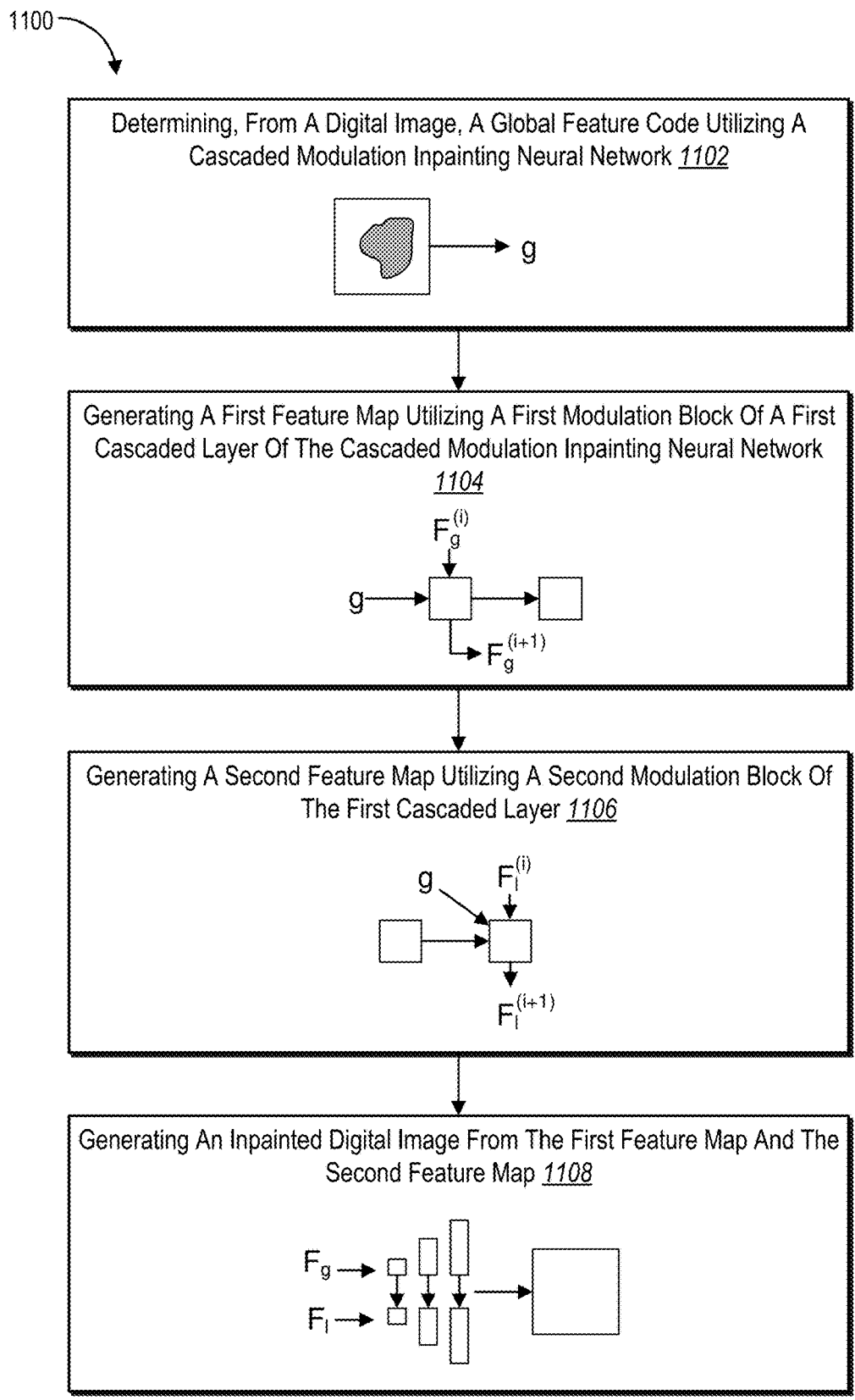
FIG. 11 illustrates a flowchart of a series of acts for generating an inpainted digital image utilizing a cascaded modulation inpainting neural network in accordance with one or more embodiments.

While FIG. 11 illustrates acts according to particular embodiments, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for generating an inpainted digital image utilizing a cascaded modulation inpainting neural network. In particular, the series of acts 1100 includes an act 1102 of determining, from a digital image, a global feature code utilizing a cascaded modulation inpainting neural network. For example, in one or more embodiments the act 1102 includes determining, from a digital image comprising a replacement region, an image encoding utilizing an encoder of a cascaded modulation inpainting neural network. Moreover, in on or more implementations determining the image encoding comprises utilizing a plurality of Fourier convolution encoder layers of the encoder to generate the image encoding.

In addition, the series of acts 1100 includes an act 1104 of generating a first feature map utilizing a first modulation block of a first cascaded layer of the cascaded modulation inpainting neural network. For example, in one or more embodiments the act 1104 includes generating a global feature map from the image encoding utilizing a global modulation block of a first cascaded modulation layer of a decoder of the cascaded modulation inpainting neural network. In one or more implementations, generating the global feature map comprises generating an intermediate global feature utilizing a first global modulation operation of the global modulation block; and generating the global feature map from the intermediate global feature utilizing a second global modulation operation of the global modulation block.

Moreover, the series of acts 1100 includes an act 1106 of generating a second feature map utilizing a second modulation block of the first cascaded layer. For example, in one or more embodiments the act 1106 includes generating an additional feature map from the image encoding utilizing a second modulation block of the first cascaded modulation layer of the decoder. To illustrate, in one or more implementations generating the additional feature map utilizing the second modulation block comprises generating a local feature map utilizing a spatial modulation block of the first cascaded modulation layer. In some implementations, the act 1100 includes generating the additional feature map utilizing the second modulation block by generating the additional feature map utilizing an additional global modulation block of the first cascaded modulation layer.

In one or more implementations generating the local feature map comprises generating an intermediate local feature from an initial local feature map utilizing a global modulation operation of the spatial modulation block; generating a spatial tensor from the intermediate global feature; and generating the local feature map from the intermediate local feature and the spatial tensor utilizing a spatial modulation operation of the spatial modulation block.

Moreover, in some implementations, generating the local feature map from the intermediate local feature and the intermediate global feature utilizing the spatial modulation operation of the spatial modulation block comprises: generating a global feature vector from the image encoding utilizing a neural network layer; combining the global feature vector and the spatial tensor to generate a modified spatial tensor; and generating the local feature map from the modified spatial tensor and the intermediate local feature utilizing the spatial modulation operation of the spatial modulation block.

In addition, in one or more implementations, generating the local feature map from the intermediate local feature and the intermediate global feature utilizing the spatial modulation operation of the spatial modulation block comprises: utilizing a spatial modulation layer of the spatial modulation operation to generate a modulated tensor; utilizing a convolutional layer of the spatial modulation operation to generate a convolved feature representation; and utilizing a demodulation layer of the spatial modulation operation to generate the local feature map from the convolved feature representation.

Further, the series of acts 1100 includes an act 1108 of generating an inpainted digital image from the first feature map and the second feature map. For example, in one or more embodiments the act 1108 includes generating an inpainted digital image by generating replacement pixels for the replacement region from the global feature map and the additional feature map utilizing additional cascaded modulation layers of the decoder. Moreover, in one or more embodiments generating the inpainted digital image further comprises generating an additional global feature map from the global feature map utilizing a global modulation block of a second cascaded modulation layer of the decoder of the cascaded modulation inpainting neural network; and generating an additional local feature map from the local feature map utilizing a spatial modulation block of the second cascaded modulation layer of the decoder.

In one or more implementations, the series of acts 1100 includes generating a global feature map from an image encoding of the digital image utilizing a global modulation block of a first cascaded modulation layer of the decoder; generating a local feature map from the image encoding utilizing a spatial modulation block of the first cascaded modulation layer of the decoder; and generating an inpainted digital image by determining replacement pixels for the replacement region utilizing additional cascaded modulation layers of the decoder from the global feature map and the local feature map.

For example, the series of acts 1100 can include determining the image encoding by utilizing a plurality of Fourier convolution encoder layers to generate a plurality of encoded feature vectors of the digital image having the replacement region at a plurality of resolutions. The series of acts 1100 can also include generating an additional global feature map at a resolution different than the global feature map utilizing an additional global modulation block of a second cascaded modulation layer of the decoder from the global feature map. In addition, the series of acts 1100 can include generating an additional local feature map at a resolution different than the local feature map utilizing an additional spatial modulation block of the second cascaded modulation layer of the decoder from the local feature map.

Moreover, the series of acts 1100 can include generating an intermediate global feature utilizing a first modulation layer, an upsampling layer, a first convolutional layer, and a first normalization layer of the global modulation block. The series of acts 1100 can also include generating the global feature map from the intermediate global feature utilizing a second modulation layer, a second convolutional layer, and a second normalization layer of the global modulation block.

In some implementations, the series of acts 1100 includes generating the local feature map by: generating a spatial tensor from the intermediate global feature utilizing a convolutional neural network layer; and generating the local feature map from the spatial tensor utilizing a second modulation layer, a second convolutional layer, and a demodulation layer of the spatial modulation block.

In some implementations, the series of acts 1100 includes a different set of acts (i.e., different than those shown in FIG. 11). For example, in some implementations, the series of acts 1100 includes: receiving, based on user interaction at a client device, a digital image comprising a replacement region; generating a feature vector for the digital image comprising the replacement region utilizing a plurality of Fourier convolution encoder layers of an encoder of a generative inpainting neural network; generating replacement pixels for the replacement region utilizing a decoder of the generative inpainting neural network and the feature vector; and providing, for display via the client device, an inpainted digital image comprising the replacement pixels.

Moreover, in some implementations, generating the replacement pixels for the replacement region utilizing the decoder of the generative inpainting neural network and the feature vector comprises generating a global feature map from the feature vector utilizing a global modulation block of a first cascaded modulation layer of a decoder of a cascaded modulation inpainting neural network.

Furthermore, in some embodiments, generating the replacement pixels for the replacement region utilizing the decoder of the generative inpainting neural network and the feature vector comprises generating a local feature map from the feature vector utilizing a spatial modulation block of the first cascaded modulation layer of the decoder.

In addition, in some implementations, the series of acts 1100 includes generating the replacement pixels from the global feature map and the local feature map utilizing additional cascaded modulation layers of the decoder of the cascaded modulation inpainting neural network.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
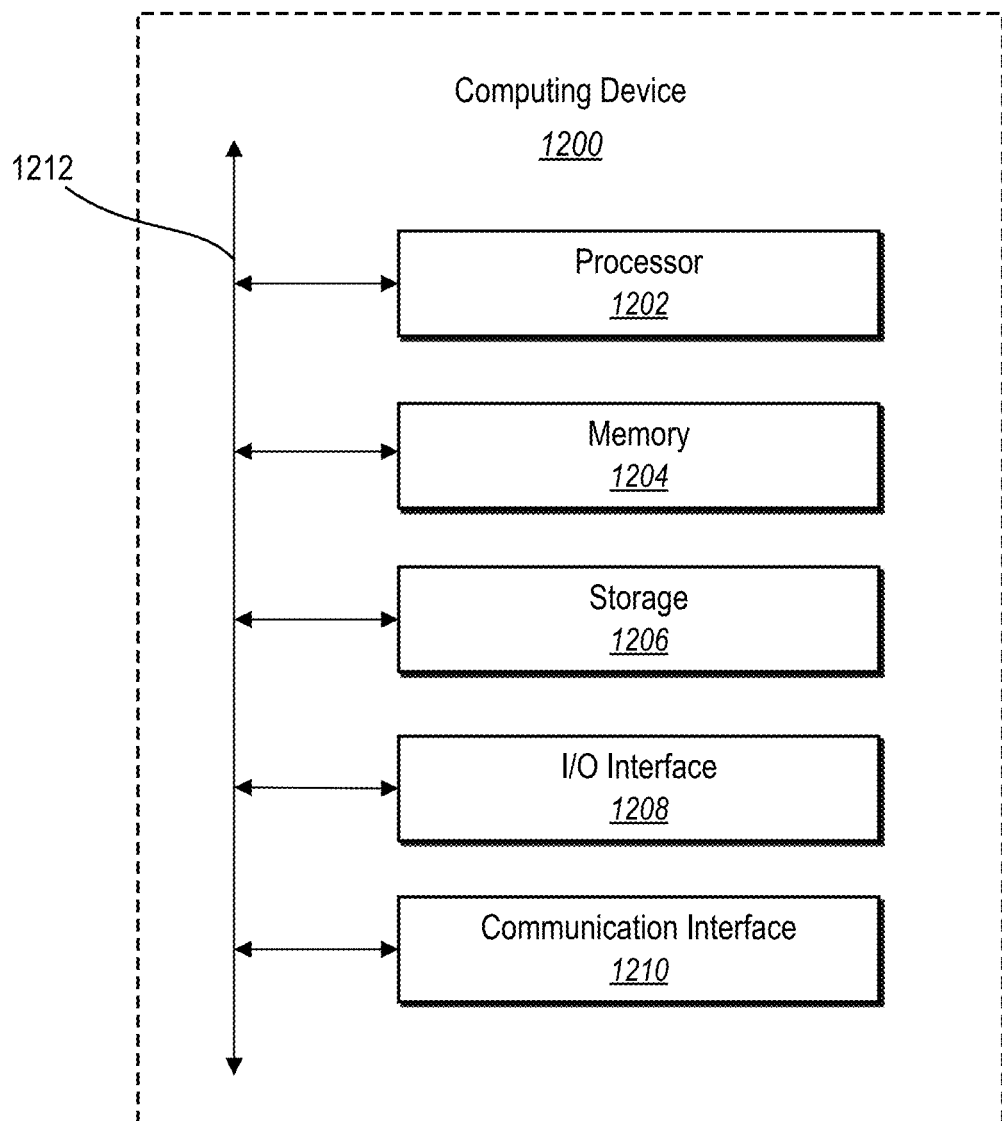
FIG. 12 illustrates a block diagram of an example computing device in accordance with one or more embodiments.

FIG. 12 illustrates, in block diagram form, an example computing device 1200 (e.g., the computing device 1000, the client device 108, and/or the server(s) 104) that may be configured to perform one or more of the processes described above. One will appreciate that the image inpainting system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/ interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause the at least one processor to perform operations comprising:

determining, from a digital image comprising a replacement region, an image encoding utilizing an encoder of a cascaded modulation inpainting neural network;

generating a global feature map from the image encoding utilizing a global modulation block of a first cascaded modulation layer of a decoder of the cascaded modulation inpainting neural network;

generating an additional feature map from the image encoding utilizing a second modulation block of the first cascaded modulation layer of the decoder; and generating an inpainted digital image by generating replacement pixels for the replacement region from the global feature map and the additional feature map utilizing additional cascaded modulation layers of the decoder.

2. The non-transitory computer readable medium of claim 1, wherein determining the image encoding comprises utilizing a plurality of Fourier convolution encoder layers of the encoder to generate the image encoding.

3. The non-transitory computer readable medium of claim 1, wherein generating the additional feature map utilizing the second modulation block comprises generating a local feature map utilizing a spatial modulation block of the first cascaded modulation layer.

4. The non-transitory computer readable medium of claim 3, wherein generating the inpainted digital image further comprises:

generating an additional global feature map from the global feature map utilizing a global modulation block of a second cascaded modulation layer of the decoder of the cascaded modulation inpainting neural network; and generating an additional local feature map from the local feature map utilizing a spatial modulation block of the second cascaded modulation layer of the decoder.

5. The non-transitory computer readable medium of claim 3, wherein generating the global feature map comprises:

generating an intermediate global feature utilizing a first global modulation operation of the global modulation block; and generating the global feature map from the intermediate global feature utilizing a second global modulation operation of the global modulation block.

6. The non-transitory computer readable medium of claim 5, wherein generating the local feature map comprises:

generating an intermediate local feature from an initial local feature map utilizing a global modulation operation of the spatial modulation block;

generating a spatial tensor from the intermediate global feature; and generating the local feature map from the intermediate local feature and the spatial tensor utilizing a spatial modulation operation of the spatial modulation block.

7. The non-transitory computer readable medium of claim 6, wherein generating the local feature map from the intermediate local feature and the intermediate global feature utilizing the spatial modulation operation of the spatial modulation block comprises:

generating a global feature vector from the image encoding utilizing a neural network layer;

combining the global feature vector and the spatial tensor to generate a modified spatial tensor; and generating the local feature map from the modified spatial tensor and the intermediate local feature utilizing the spatial modulation operation of the spatial modulation block.

8. The non-transitory computer readable medium of claim 6, wherein generating the local feature map from the intermediate local feature and the intermediate global feature utilizing the spatial modulation operation of the spatial modulation block comprises:

utilizing a spatial modulation layer of the spatial modulation operation to generate a modulated tensor;

utilizing a convolutional layer of the spatial modulation operation to generate a convolved feature representation; and utilizing a demodulation layer of the spatial modulation operation to generate the local feature map from the convolved feature representation.

9. The non-transitory computer readable medium of claim 1, wherein generating the additional feature map utilizing the second modulation block comprises generating the additional feature map utilizing an additional global modulation block of the first cascaded modulation layer.

10. A system comprising:

one or more memory devices comprising:

a digital image having a replacement region, and a cascaded modulation inpainting neural network comprising an encoder and a decoder, wherein the decoder comprises a plurality of cascaded modulation layers; and one or more processors configured to cause the system to:

generate a global feature map from an image encoding of the digital image utilizing a global modulation block of a first cascaded modulation layer of the decoder;

generate a local feature map from the image encoding utilizing a spatial modulation block of the first cascaded modulation layer of the decoder; and generate an inpainted digital image by determining replacement pixels for the replacement region utilizing additional cascaded modulation layers of the decoder from the global feature map and the local feature map.

11. The system of claim 10, wherein the one or more processors are further configured to cause the system to determine the image encoding by utilizing a plurality of Fourier convolution encoder layers to generate a plurality of encoded feature vectors of the digital image having the replacement region at a plurality of resolutions.

12. The system of claim 10, wherein the one or more processors are further configured to cause the system to generate an additional global feature map at a resolution different than the global feature map utilizing an additional global modulation block of a second cascaded modulation layer of the decoder from the global feature map.

13. The system of claim 12, wherein the one or more processors are further configured to cause the system to generate an additional local feature map at a resolution different than the local feature map utilizing an additional spatial modulation block of the second cascaded modulation layer of the decoder from the local feature map.

14. The system of claim 10, wherein the one or more processors are further configured to cause the system to generate an intermediate global feature utilizing a first modulation layer, an upsampling layer, a first convolutional layer, and a first normalization layer of the global modulation block.

15. The system of claim 14, wherein the one or more processors are further configured to cause the system to generate the global feature map from the intermediate global feature utilizing a second modulation layer, a second convolutional layer, and a second normalization layer of the global modulation block.

16. The system of claim 14, wherein the one or more processors are further configured to cause the system to generate the local feature map by:

generating a spatial tensor from the intermediate global feature utilizing a convolutional neural network layer; and generating the local feature map from the spatial tensor utilizing a second modulation layer, a second convolutional layer, and a demodulation layer of the spatial modulation block.

17. A computer-implemented method comprising:
receiving, based on user interaction at a client device, a digital image comprising a replacement region;
generating a feature vector for the digital image comprising the replacement region utilizing a plurality of Fourier convolution encoder layers of an encoder of a generative inpainting neural network;
generating replacement pixels for the replacement region utilizing a decoder of the generative inpainting neural network and the feature vector; and
providing, for display via the client device, an inpainted digital image comprising the replacement pixels.

18. The computer-implemented method of claim 17, wherein generating the replacement pixels for the replacement region utilizing the decoder of the generative inpainting neural network and the feature vector comprises generating a global feature map from the feature vector utilizing a global modulation block of a first cascaded modulation layer of a decoder of a cascaded modulation inpainting neural network.

19. The computer-implemented method of claim 18, wherein generating the replacement pixels for the replacement region utilizing the decoder of the generative inpainting neural network and the feature vector comprises generating a local feature map from the feature vector utilizing a spatial modulation block of the first cascaded modulation layer of the decoder.

20. The computer-implemented method of claim 19, further comprising generating the replacement pixels from the global feature map and the local feature map utilizing additional cascaded modulation layers of the decoder of the cascaded modulation inpainting neural network.

* * * * *